US012077236B2

(12) United States Patent
Munro et al.

(10) Patent No.: US 12,077,236 B2
(45) Date of Patent: Sep. 3, 2024

(54) BICYCLE SEATING SYSTEM AND COMPONENTS THEREOF

(71) Applicant: Kids Ride Shotgun Limited, Tauranga (NZ)

(72) Inventors: Stuart Gregory Munro, Mount Maunganui (NZ); Thomas Charles Hayward, Mount Maunganui (NZ)

(73) Assignee: Kids Ride Shotgun Limited, Tauranga (NZ)

( * ) Notice: Subject to any disclaimer, the term of this patent is extended or adjusted under 35 U.S.C. 154(b) by 135 days.

(21) Appl. No.: 17/659,756

(22) Filed: Apr. 19, 2022

(65) Prior Publication Data

US 2022/0332384 A1 Oct. 20, 2022

(30) Foreign Application Priority Data

Apr. 20, 2021 (AU) ................................ 2021901160

(51) Int. Cl.
*B62J 1/16* (2006.01)
*B62J 1/08* (2006.01)
*B62J 25/06* (2020.01)

(52) U.S. Cl.
CPC ................. *B62J 1/167* (2013.01); *B62J 1/08* (2013.01); *B62J 25/06* (2020.02)

(58) Field of Classification Search
CPC ............... B62J 1/167; B62J 1/16; B62J 25/06
See application file for complete search history.

(56) References Cited

U.S. PATENT DOCUMENTS

| 3,619,003 | A | * | 11/1971 | Rich, Jr. | ..................... B62J 1/16 297/243 |
| 3,743,321 | A | * | 7/1973 | Luschen | .................. B62J 1/165 280/202 |
| 5,927,801 | A | * | 7/1999 | Miree | ....................... B62J 1/167 297/195.1 |
| 2016/0096569 | A1 | * | 4/2016 | Adams | ..................... B62J 1/167 297/195.13 |
| 2020/0277013 | A1 | | 9/2020 | Zhifeng | |
| 2023/0091436 | A1 | * | 3/2023 | Rippel | ..................... B62J 1/167 280/202 |

FOREIGN PATENT DOCUMENTS

| CN | 207015486 | 2/2018 |
| DE | 374887 | 5/1925 |
| GB | 2443086 | 4/2008 |

* cited by examiner

*Primary Examiner* — Timothy J Brindley
(74) *Attorney, Agent, or Firm* — FINNEGAN, HENDERSON, FARABOW, GARRETT & DUNNER LLP

(57) ABSTRACT

The disclosure provides an adjustable child's seating system for attaching to the frame of a bicycle. The seating system comprises a crossbar on which a connection hub is mounted. The connection hub attaches both a saddle and leg assembly to the crossbar. The connection hub is adjustable to adjust the angle of tilt of the saddle and/or the angle of the leg assembly relative to the saddle.

15 Claims, 27 Drawing Sheets

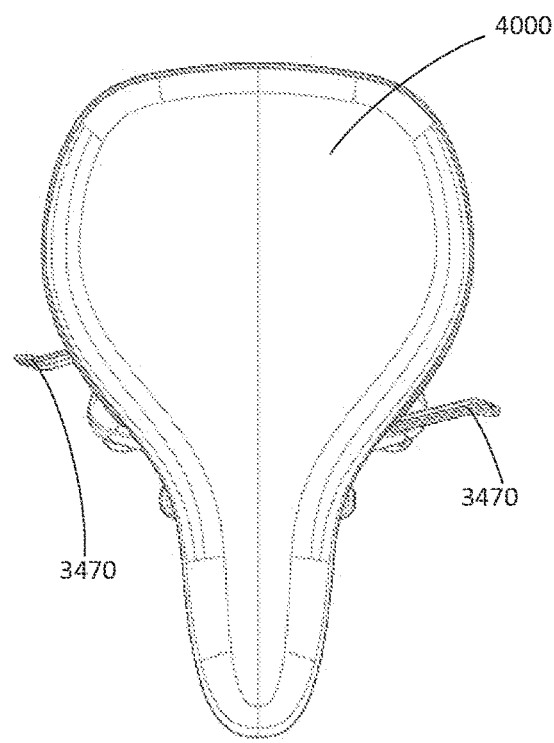
FIGURE 14A
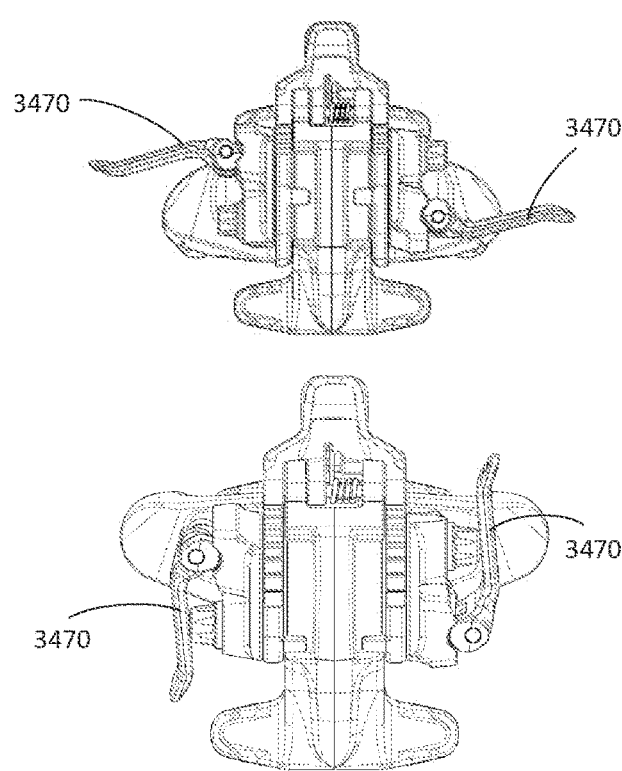
FIGURE 14B
FIGURE 14C

BICYCLE SEATING SYSTEM AND COMPONENTS THEREOF

The present disclosure claims the benefit of priority to Australian Patent Application No. 2021901160, filed Apr. 20, 2021, which is incorporated herein by reference in its entirety.

FIELD OF INVENTION

This disclosure relates to a child's seating system that is configured to be attached to the frame of a bicycle, such as an adult-sized bicycle. The seating system is adjustable for use with different bicycle frames and to suit the needs of different children. The disclosure also relates to components of the seating system that allow for its adjustable nature.

BACKGROUND

Very young children are typically unable to ride a bicycle themselves or to ride a bicycle at the speed of an adult. Therefore, it is common to attach a seat for a child to an adult-sized bicycle to allow the adult and child to ride together. For the sake of simplicity, an adult-sized bicycle will be referred to in this specification as an 'adult bicycle', 'adult bike' or 'adult mountain bike'.

An adult bicycle includes two wheels, mounted on a frame. The frame also supports handle bars for steering and a saddle on which the adult sits, when in use.

A child's bicycle seat can be attached to the frame of the adult bicycle at the rear of the bicycle, behind the saddle of the adult bicycle. These seats are referred to as rear-mounted seats. Alternatively, the child's seat can be attached to the frame of the adult bicycle at the front of the bicycle, between the handlebars and saddle of the adult bike. These seats are referred to as front-mounted seats.

Front-mounted children's bicycle seats have become particularly popular for adults wanting to take young children mountain biking, especially because these seats allow the children to be active participants in cycling adventure—even more so if the children's bicycle seat comprises a saddle (as opposed to a bucket seat).

However, different types of adult bicycles comprise different sized frames and different shaped frames, such that a child may be comfortably seated on a child's bicycle seat attached to one type of adult bike frame, but may be seated at an uncomfortable or dangerous angle when the same child's bicycle seat is attached to a different adult bike frame.

There is therefore a need to provide a child's bicycle seating system that can be comfortably used with different adult bike frames.

It is an object of the present disclosure to go at least some way toward addressing this need, or to at least provide the public with a useful alternative.

SUMMARY OF INVENTION

In a first aspect, the disclosure provides a connection hub to attach a bicycle saddle and leg assembly to a crossbar. The connection hub comprises: a central body attachable to the crossbar and comprising a pivotable leg locking lever; and a pair of leg attachment members, each leg attachment member being rotatably attached to one side of the central body such that the central body is located between the leg attachment members. Each leg attachment member comprises a face plate rotatably attached to the central body, and also comprises a leg connector that attaches a pair of legs of the leg assembly to the connection hub, each of the legs comprising a foot support. Each face plate comprises a toothed rack and the leg locking lever comprises a pawl that engages with the toothed rack to lock the leg attachment member relative to the central body when the leg locking lever is in a locked position, thereby locking the angle of the legs relative to the connection hub. The pawl disengages from the toothed rack when the leg locking lever is in an unlocked position, allowing each leg attachment member to rotate relative to the connection hub to adjust the angle of the legs relative to the connection hub.

In a second aspect, the disclosure provides a connection hub to attach a bicycle saddle and leg assembly to a crossbar, the connection hub comprising: a central body attachable to the crossbar; a pair of leg attachment members, each leg attachment member being rotatably attached to one side of the central body such that the central body is located between the leg attachment members; and a pair of saddle attachment members, each saddle attachment member being rotatably attached to one of the leg attachment members and the central body, such that the leg attachment members are located between the central body and an adjacent one of the saddle attachment members. Each leg attachment member comprises a face plate rotatably attached to the central body, and also comprises a leg connector that attaches a pair of legs of the leg assembly to the connection hub, each of the legs comprising a foot support. Each saddle attachment member comprises a saddle receiving portion to receive a portion of the saddle therein. The central body comprises a pair of arcuate saddle adjustment slots extending from a first side of the central body to a second side of the central body. Each leg attachment member comprises a pair of arcuate saddle adjustment slots that substantially align with the arcuate saddle adjustment slots of the central body, and each saddle attachment member comprises a locking pin that extends through the aligned arcuate saddle adjustment slots and is slidable within the arcuate saddle adjustment slots to allow the angle of the saddle to be adjusted relative to the connection hub and the crossbar.

In a third aspect, the disclosure comprises a connection hub to attach a bicycle saddle and leg assembly to a crossbar, the connection hub comprising: a central body attachable to the crossbar and comprising a pair of arcuate saddle adjustment slots extending from a first side of the central body to a second side of the central body, and a pivotable leg locking lever; a pair of leg attachment members, each leg attachment member being rotatably attached to one side of the central body such that the central body is located between the leg attachment members; and a pair of saddle attachment members, each saddle attachment member being rotatably attached to one of the leg attachment members and the central body, such that the leg attachment members are located between the central body and an adjacent one of the saddle attachment members. Each saddle attachment member comprises a saddle receiving portion to receive a portion of the saddle therein. Each leg attachment member comprises a face plate rotatably attached to the central body, and also comprises a leg connector that attaches a pair of legs of the leg assembly to the connection hub, each of the legs comprising a foot support. Each face plate comprises a toothed rack and the leg locking lever comprises a pawl that engages with the toothed rack to lock the leg attachment member relative to the central body when the leg locking lever is in a locked position, thereby locking the angle of the legs relative to the connection hub, and wherein the pawl disengages from the toothed rack when the leg locking lever is in a unlocked position, allowing each leg attachment member to rotate relative to the connection hub to adjust the angle of the legs relative to the connection hub. Each face plate also comprises a pair of arcuate saddle adjustment slots that substantially align with the arcuate saddle adjustment slots of the central body; and each saddle attachment member comprises a locking pin that extends through the aligned arcuate saddle adjustment slots and is slidable within the arcuate saddle adjustment slots to allow the angle of the saddle to be adjusted relative to the connection hub and the crossbar.

In some forms of connection hub according to the disclosure, the central body comprises an attachment aperture and each leg attachment member comprises an attachment shaft that substantially aligns with the attachment aperture of the central body, and wherein each attachment shaft extends through at least a portion of the attachment aperture of the central body and engages with the other attachment shaft of the other leg attachment member to rotatably attach the leg attachment members to the central body and to each other.

In some forms, each leg attachment member comprises an attachment aperture and wherein a fastener engages with the attachment apertures of the leg attachment members and the central body to rotatably attach the leg attachment members to the central body.

Optionally, each leg connector is attachable to the respective leg in a first, neutral position, and in a second, splayed position, in which the legs are splayed apart.

In some forms, the leg locking lever is biased to the locked position.

Optionally, the saddle comprises a cushion and a pair of tubular saddle rails located beneath the cushion, and wherein the saddle receiving portion of each saddle attachment member is located on an inner surface of the saddle attachment member and comprises a channel for receiving a portion of a respective saddle rail.

In some forms, the legs are length-adjustable.

In a fourth aspect, the disclosure provides a seating system for a bicycle comprising a connection hub of any one of the first, second and third aspects of the disclosure and also comprising a saddle attached to the connection hub, and a crossbar on which the connection hub is mounted.

In some forms, the connection hub is slidably mounted on the crossbar.

Optionally, the crossbar is extendable.

In some forms, the crossbar comprises a first connector, hingedly attached to a first end of the crossbar, and a second connector hingedly attached to a second end of the crossbar, wherein the first connector is configured to attach the seating system to a steering column of a bicycle and the second connector is configured to attach the seating system to a seat post of the bicycle.

In some forms, the second connector comprises a body comprising a hinge member for hingedly attaching to the crossbar, and a pair of clamping arms pivotally attached to the body and configured to rotate toward each other to form a closed position, in which the arms define a hollow region for receiving a portion of the seat post therein, and to rotate away from each other to form an open position, and wherein the second connector further comprises a pin hingedly attached to a first of the clamping arms and removably attachable to a second of the clamping arms to clamp the second connector around the seat post.

Optionally, a first end of the pin is hingedly attached to the first clamping arm and the second end of the pin is hingedly attached to a cam lever, wherein the second clamping arm comprises a distal end comprising an opening and also comprising a curved recess for receiving a cam of the cam lever, wherein in a locked position, a portion of the pin is removably received within the opening of the second clamping arm and the cam is received within the curved recess to urge the clamping arms toward each other.

In a fifth aspect, the disclosure provides a clamping connector comprising: a body; a pair of first and second clamping arms hingedly attached to the body, each clamping arm comprising a first end and a second end; and a pin comprising a first end and a distal end, the pin being hingedly attached to the second end of the first clamping arm, wherein the second end of the second clamping arm comprises a pin receiving opening for removably receiving the distal end of the pin therein. The pin comprises a fastener configured to urge the clamping arms toward each other in a closed position, and wherein the clamping arms are moveable to an open position by slidably removing the pin from the pin receiving opening and rotating the clamping arms away from each other.

Unless the context clearly requires otherwise, throughout the description and the claims, the words "comprise", "comprises", "comprising", and the like, are to be construed in an inclusive sense as opposed to an exclusive or exhaustive sense, that is to say, in the sense of "including, but not limited to".

Reference to any prior art in this specification is not, and should not be taken as, an acknowledgement or any form of suggestion that that prior art forms part of the common general knowledge in the field of endeavour in any country in the world.

The disclosure consists in the foregoing and also envisages constructions of which the following gives examples only.

BRIEF DESCRIPTION OF THE DRAWINGS

FIG. 14A is a top view of the saddle assembly of FIG. 12A and in which the quick release levers of the saddle attachment members are in the open position;

FIG. 14B is top view of the saddle assembly of FIG. 14A, but with the saddle hidden and showing the quick release levers of the saddle attachment members in the open position;

FIG. 14C is a top view of the saddle assembly of FIG. 14A, but with the saddle hidden and showing the quick release levers of the saddle attachment members in the closed position;

DETAILED DESCRIPTION

The disclosure is further described with reference to the following examples. It will be appreciated that the disclosure as claimed is not intended to be limited in any way by these examples.

As exemplified by embodiments shown in FIGS. 1 to 25, the present disclosure relates to an adjustable child's seating system 1000 for attaching to the frame of a bicycle 8000, such as an adult-sized bike, preferably a mountain bike. The seating system 1000 is configured to be positioned between the handlebars and saddle of the bicycle. The system 1000 comprises an elongate crossbar 2000 comprising a first end that is attachable to a steering column of the bicycle 8000, and a second end that is attachable to a seat post of the bicycle 8000. An adjustable connection hub assembly 3000 is mounted to the crossbar 2000. In at least one embodiment, the hub assembly 3000 predominantly sits on top of the crossbar 2000. The connection hub assembly 3000 is attachable to a child's saddle 4000 and to a leg assembly 5000. The hub assembly 3000 attaches the saddle 4000 and leg assembly 5000 to the crossbar 2000. The leg assembly 5000 comprises a pair of legs 5100 and a foot support 5200 attached to each leg 5100. The leg 5100 and foot support 5200 are mirror images of each other.

Figure 1:
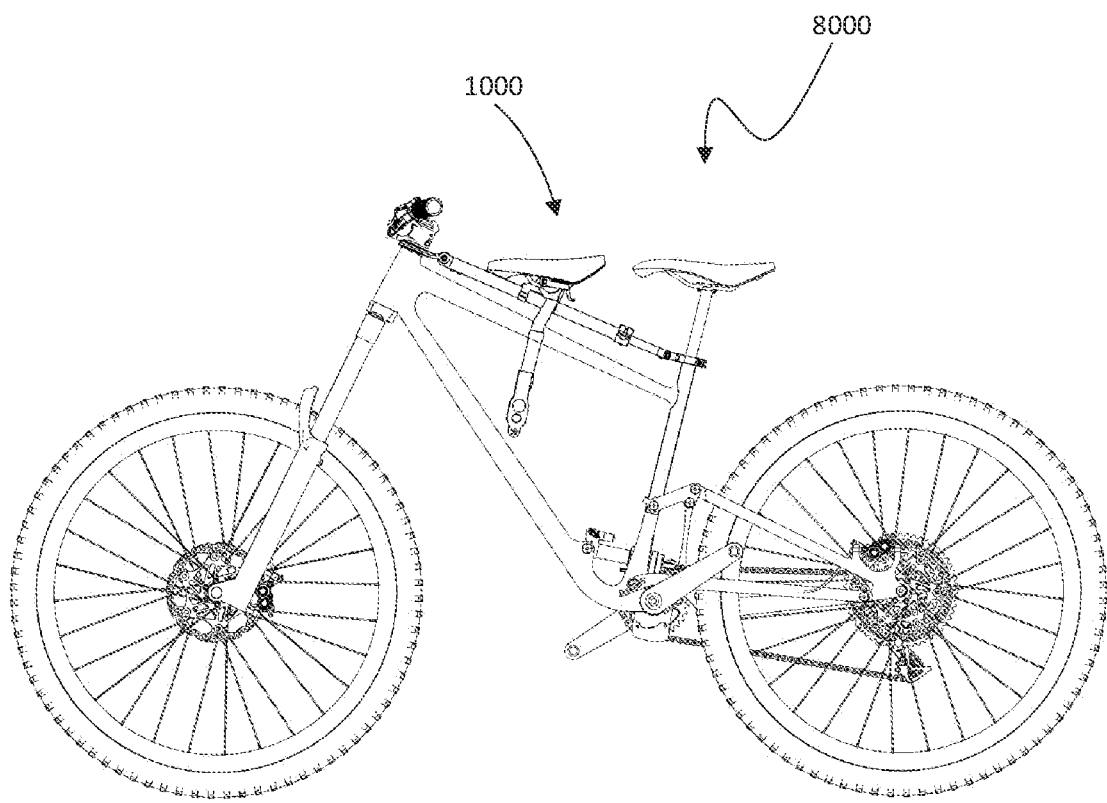
FIG. 1 is a side view of one form of the seating system mounted to one form of bicycle.
Figure 2:
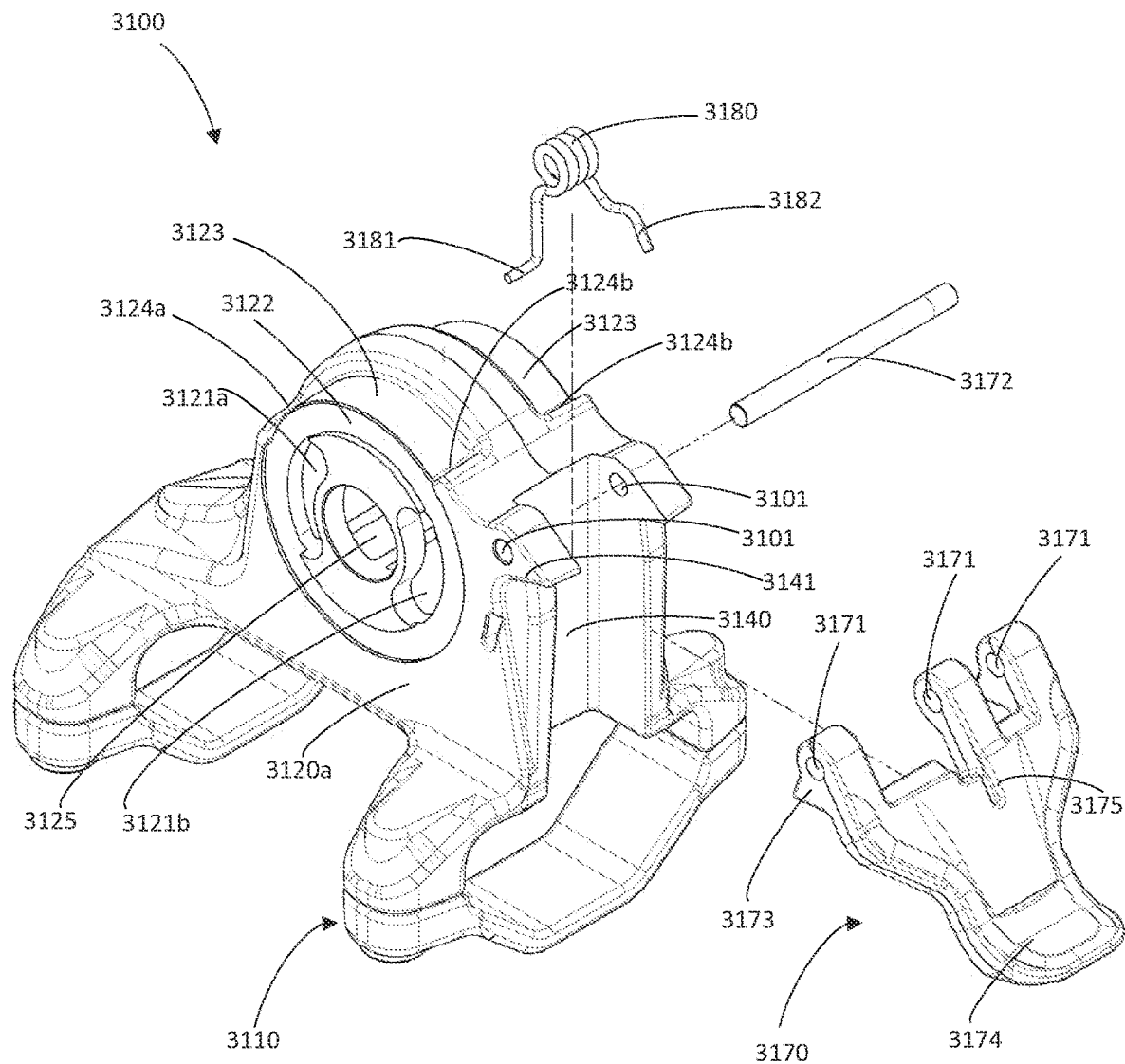
FIG. 2 is an exploded isometric view of one form of central hub body of the seating system and shows one form of leg locking lever that is hingedly attached to the central body.
Figure 3:
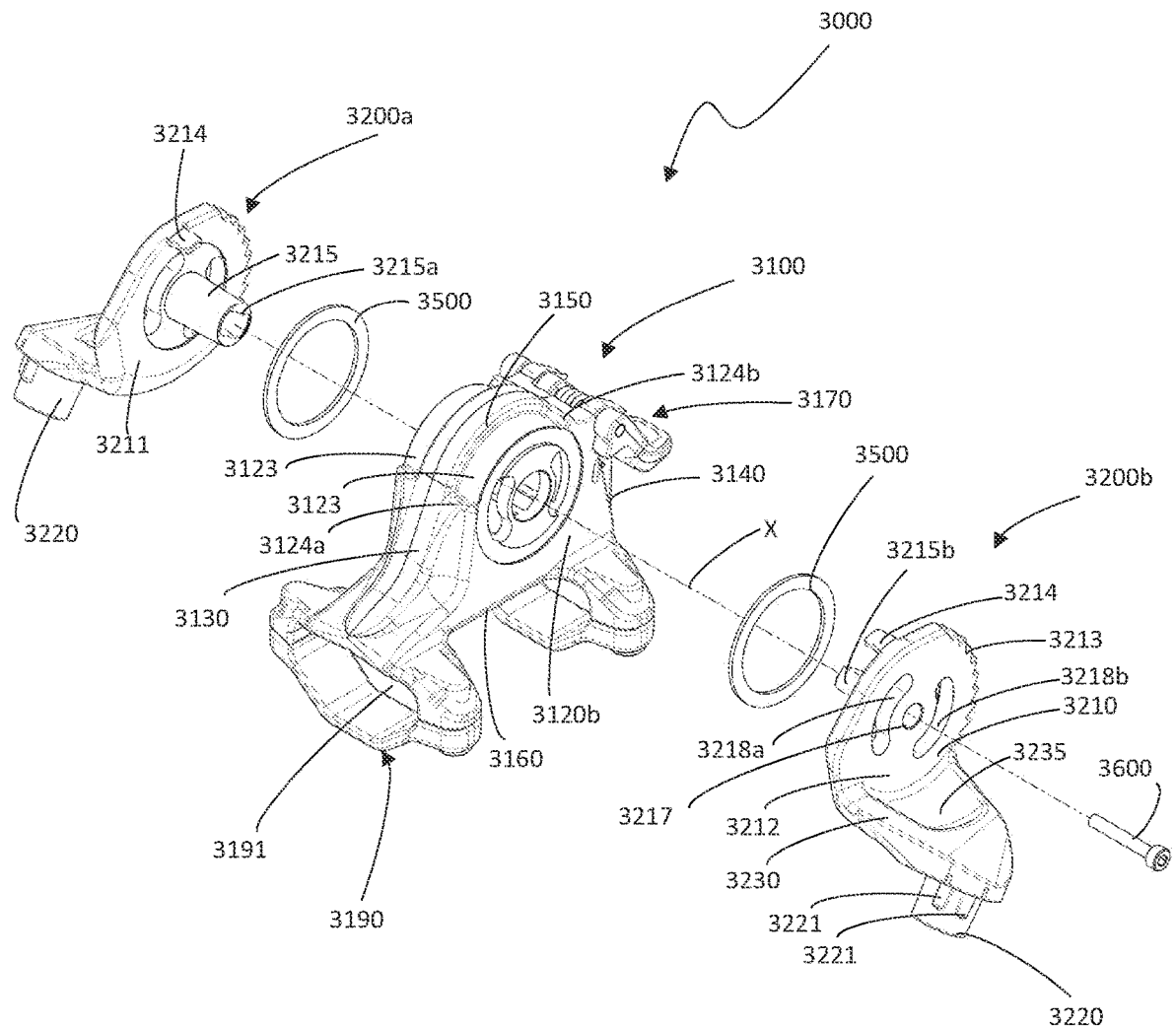
FIG. 3 is an exploded isometric view of a central hub body of FIG. 2 and a pair of leg attachment members.
Figure 4A:
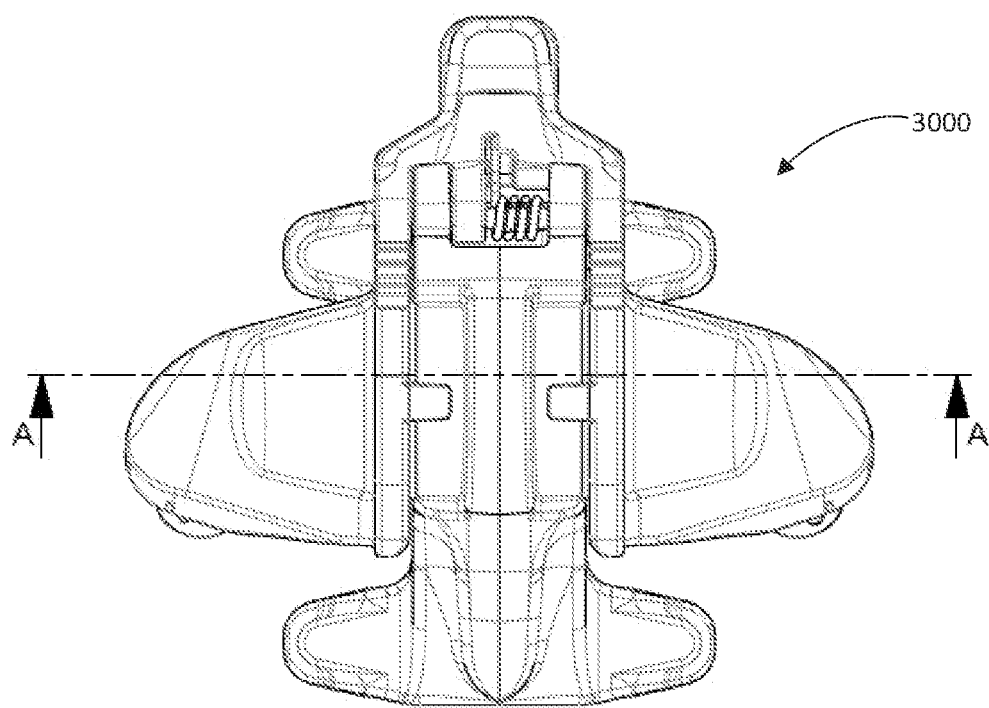
FIG. 4A is a plan view from below, showing the assembly of the central hub body and leg attachment members of FIG. 3.

Referring to FIGS. 2 to 4, the hub assembly 3000 comprises a central body 3100 comprising a mounting portion 3110 for mounting the hub assembly 3000 to a crossbar 2000; first and second generally opposing sides 3120a, 3120b; a front portion 3130; a rear portion 3140; an upper portion 3150; and a lower portion 3160.

In some forms, as shown in FIG. 3, the hub assembly 3000 comprises a pair of leg attachment members 3200a, 3200b located on either side of the central body 3100 to attach the leg assembly 5000 to the hub assembly 3000. A first 3200a of the leg attachment members is attachable to the first side 3120a of the central body 3100 and a second 3200b of the leg attachment members is attachable to the second side 3120b of the central body 3100. In some forms, each leg attachment member 3200 is rotatably attached to the central body in order to rotate relative to the central body 3100 to adjust the angle at which the leg assembly 5000 extends from the hub assembly 3000 and from the saddle 4000.

In some forms, the hub assembly 3000 comprises a pair of first and second saddle attachment members 3400a, 3400b to attach the saddle 4000 to the hub assembly 3000. The saddle attachment members 3400a, 3400b are located on either side of the central body 3100 and adjacent to the leg attachment members 3200a, 3200b, such that each leg attachment member 3200a, 3200b is located between one side of the central body 3100 and a respective saddle attachment member 3400a, 3400b. In some forms, the saddle attachment members 3400 are rotatably attached to the central body 3100 so as to rotate relative to the central body 3100 to adjust the angle of the saddle 4000 relative to the central body 3100 and the cross bar 2000.

Figure 9:
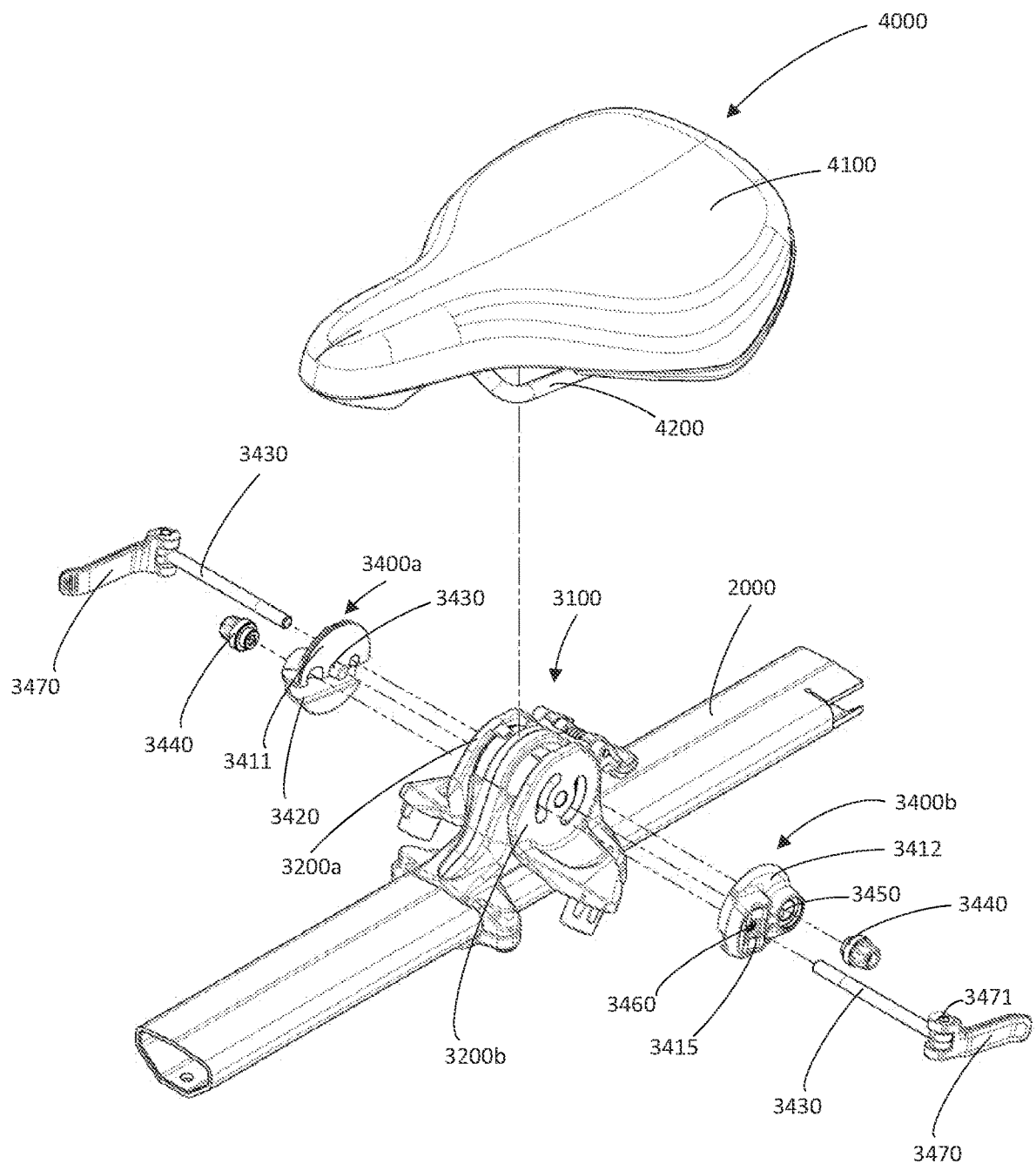
FIG. 9 is an exploded isometric view from above showing one form of seating system, including a crossbar on which is mounted a central hub body and a pair of leg attachment members and to which is attached a pair of saddle adjustment members comprising a quick release locking system.
Figure 10:
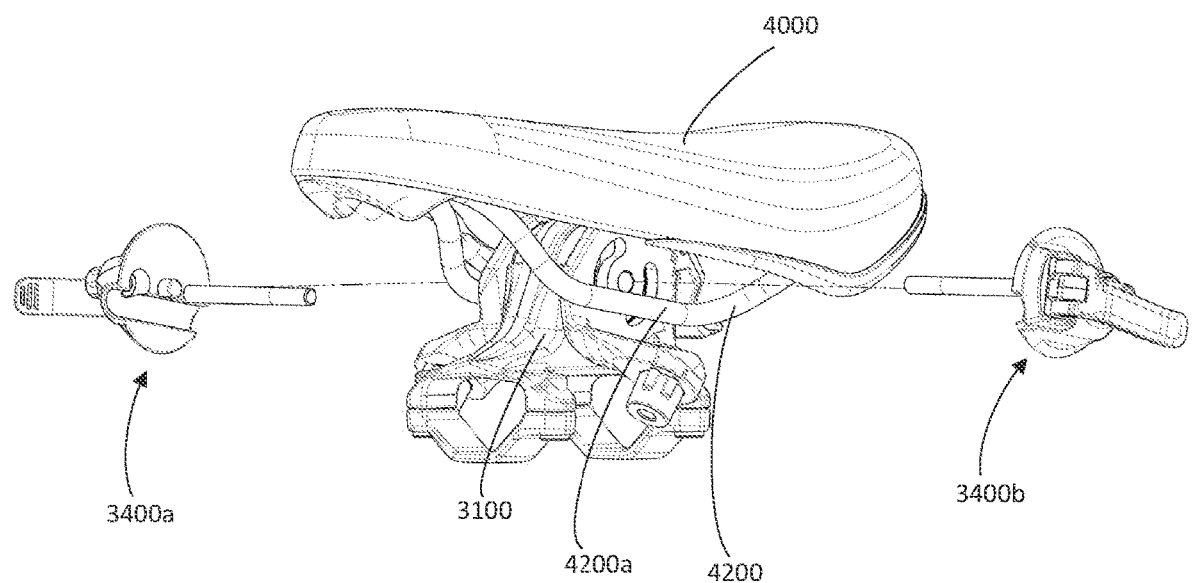
FIG. 10 is an exploded isometric view from the side showing a saddle positioned over the central hub body and leg attachment members to receive the saddle attachment members.

Referring to FIGS. 2, 3 and 9, the central hub body 3100 may comprise an attachment feature 3125 to align the central body 3100 with the leg attachment members 3200a, 3200b and the saddle attachment members 3400a, 3400b. In some forms, the attachment feature 3125 comprises an attachment aperture passing through the central body 3100 from the first side 3120a to the second side 3120b and being configured to align with a corresponding attachment feature 3215 of each leg attachment member 3200a, 3200b and a locating member 3430 of each saddle attachment member 3400a, 3400b.

The central body 3100 may also comprise at least one arcuate saddle angle adjustment slot 3121 that extends between the first and second sides 3120a, 3120b of the central body 3100. In some forms, the central body 3100 comprises a pair of first and second arcuate saddle angle adjustment slots 3121a, 3121b that curve around and are spaced equidistant from a central point/axis such that each of the slots 3121 has an equal radius. The central point/axis of the arcuate saddle adjustment slots 3121 may comprise the central point/axis of the attachment aperture 3125 so that the attachment aperture is substantially centrally located between the saddle angle adjustment slots 3121a, 3121b.

In some forms, the first and second sides 3120a, 3120b of the central body 3100 comprise an annular recess 3122 for receiving an annular bearing 3500 therein. The annular recess 3122 surrounds the attachment aperture 3125 and the saddle angle adjustment slot(s) 3121. In some forms, the annular recess 3122, the central axis of the attachment aperture 3125, and the attachment aperture 3125 are positioned substantially concentrically on the central body 3100. Each annular bearing allows for smooth rotation of the respective leg attachment members 3200a, 3200b relative to the central body 3100 when the hub assembly 3000 is unlocked (i.e. when the leg attachment members are free to rotate) and provides an element of resistance when the hub assembly is locked to help prevent rotation of the leg attachment members 3200a, 3200b relative to the central body 3100.

In some forms, the central body 3100 comprises a guide path 3123 for guiding the rotation of the leg attachment members 3200 relative to the central body 3100. The guide path 3123 comprises a first end and a second end. Each end of the guide path 3123 comprises a limit stop 3124a 3124b. Optionally, the guide path 3123 is formed along an edge of the upper portion 3150 of the central body 3100, as shown in FIGS. 2 and 3. In some forms, the central body 3100 comprises a guide path 3123 located on each side 3120a, 3120b of the central body and along an edge of the upper portion of the central body. A central portion of the central body 3100 may define a side wall of the guide path and an inner surface 3211 of the adjacent leg attachment member 3200 may define a substantially opposing side wall of the guide path 3123. Limit stops 3124a, 3124b define the forward and rearward ends of the guide path. In other forms, a guide path 3123 may be formed within a side surface on each side 3120a, 3120b of the central body 3100.

In some forms, the central body 3100 comprises a pivotable leg locking lever 3170 configured to lock and unlock the angular position of the leg assembly 5000 relative to the saddle 4000. The pivotable locking lever 3170 is moveable between a first, locked position and a second, unlocked position. In the locked position, the lever 3170 engages with each leg attachment member 3200 to prevent rotation of the leg attachment members relative to the central body 3100 in order to lock the angle of the leg assembly 5000 relative to the hub assembly 3000 and the saddle 4000. In the unlocked position, the lever 3170 is disengaged from each leg attachment member 3200a, 3200b to allow the leg attachment members to rotate relative to the central body 3100 in order to adjust the angle of the leg assembly 5000 relative to the hub 3000 and therefore relative to the saddle 4000 and crossbar 2000.

The lever 3170 may be hingedly attached to the central body 3100 by a pivot shaft 3172 that passes through aligned apertures 3101, 3171 provided in the hub and a first end portion of the lever 3170. In some forms, the lever 3170 comprises a catch/pawl 3173 located at or near a first end of the lever. The catch 3173 engages with each leg attachment member 3200 in the locked position and disengages with each leg attachment member 3200 in the unlocked position. The lever 3170 may also comprise a gripping portion/handle 3174, preferably located at a second end of the lever, which is substantially opposite to the first end. The gripping portion 3170 allows a user to grip the lever 3170 and to lower and raise the second end of the lever 3170 to cause the lever 3170 to pivot about the pivot shaft 3172 in order to move between the locked and unlocked positions.

In at least one embodiment, as shown in FIG. 2, the locking lever 3170 comprises a biasing member 3180, such as a torsion spring or the like, that biases the lever 3170 to the locked position. The biasing member 3180 may surround a portion of the pivot shaft 3172 and engages with both the central body 3100 and the lever 3170 to push or pull the lever toward the locked position. In some forms, the biasing member 3180 surrounds a portion of the pivot shaft 3172 and comprises a first arm 3181 that engages with the hub assembly 3000 and a second arm 3182 that engages with the locking lever 3170 to urge the locking lever 3170 toward the locked position. In some forms, the first arm 3181 engages with a notch, opening, or recess located on the central body 3100, or the first arm 3181 extends beneath a hook/projection 3141 of the central body. In some forms, the second arm 3182 engages with the locking lever 3170 by engaging with or nesting within a notch or recess 3175 provided on the body of the locking lever. In at least one embodiment, the locking lever 3170 is located at or near the rear portion 3140 of the hub assembly 3000, as shown in FIGS. 2 and 3, so as to be accessible from the rear of the bicycle 8000.

In some forms, the locking lever 3170 comprises a pair of catches 3173, one on either side of the lever 3170, to engage with both leg attachment members 3200a, 3200b on either side of the central body 3100. In this arrangement, the central body 3100 is configured so that the lever 3170 engages with both leg attachment members 3200a, 3200b simultaneously when in the locked position, and disengages with both leg attachment members 3200a, 3200b simultaneously when in the unlocked position.

To attach each leg 5100 of the leg assembly 5000 to the central body 3100, the first and second leg attachment members 3200a, 3200b may each comprise an attachment element, such as a face plate 3210, that is configured to attach to a respective first or second side 3120a, 3120b of the central body 3100. Each leg attachment member 3200a, 3200b may also comprise a leg connector 3220, configured to attach to one of the first and second legs 5100 of the leg assembly 5000. Typically, the face plate 3210 projects in a first direction, such as a generally upward direction, and the leg connector 3220 projects in a second direction, such as a generally downward and slightly forward-facing direction. In some forms, each leg attachment member 3200a, 3200b further comprises a foot 3230 that connects the face plate 3210 to the leg connector 3220 and is arranged substantially perpendicular to the face plate and leg connector, to provide a crank-like arrangement. The foot 3230 comprises an upper surface and a lower surface. The upper surface may comprise a recessed/hollowed region 3235, such as a concave region, for receiving a rotating portion of the respective saddle attachment member 3400a, 3400b therein, as shown in FIG. 3.

Figure 6:
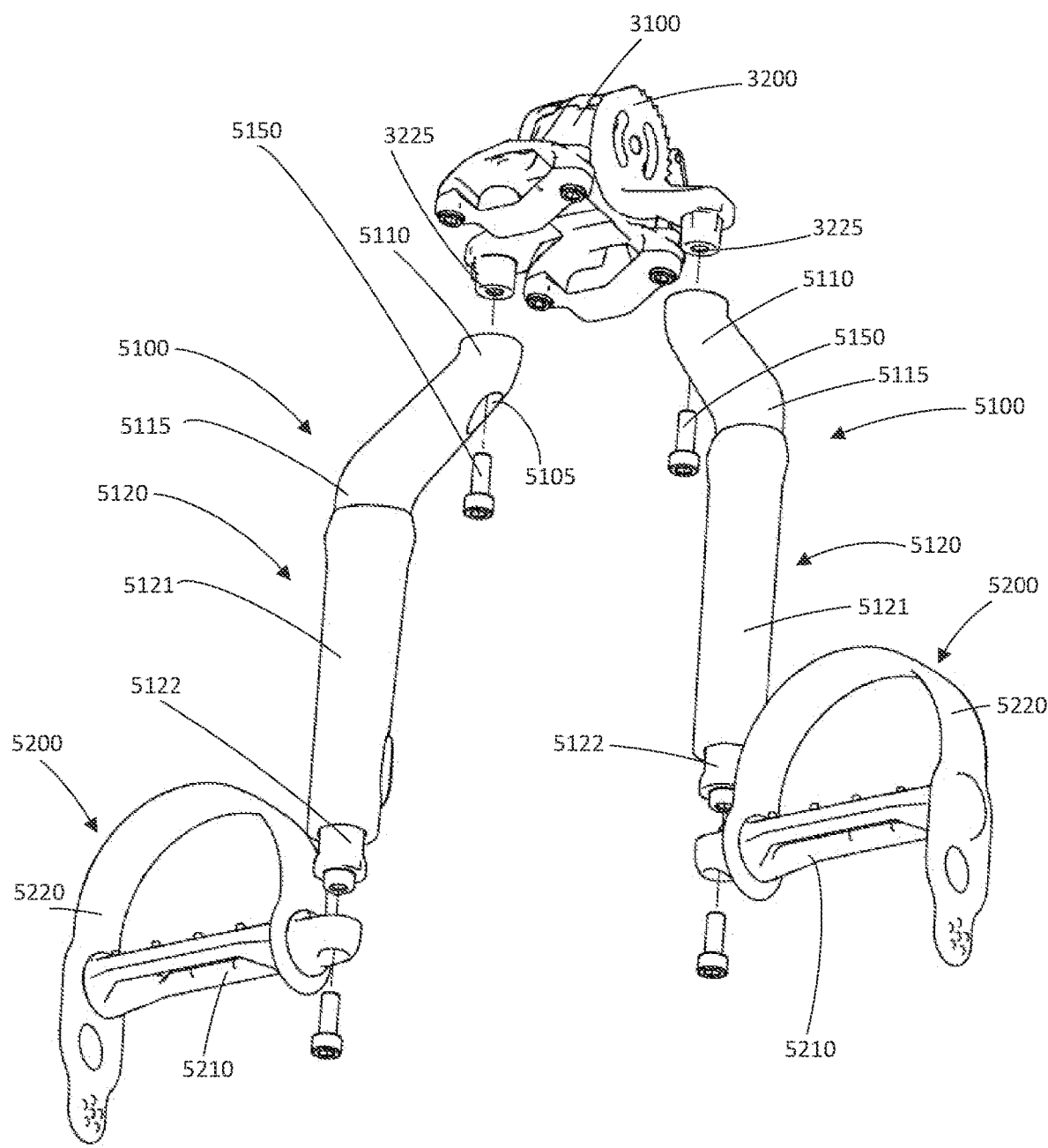
FIG. 6 is an exploded view illustrating one form of attachment between the leg assembly and the central body.

Each leg connector 3220 projects from the lower surface of the foot 3230. In some forms, each leg connector 3220 comprises a substantially cylindrical boss that is shaped and dimensioned to mate with a substantially cylindrical first end of a respective leg 5100 to attach the leg 5100 to the leg connector 3220, as shown in FIGS. 3 and 6, for example. In some forms, the leg connector 3220 nests within a hollow provided at the first end of the respective leg 5100. In other forms, the leg connector 3220 comprises a hollow and the respective leg 5100 is partially housed within the hollow of the leg connector 3220.

In some forms, the central body 3100 and the leg attachment members 3200 together form a leg angle adjustment system configured to allow the angle of the leg assembly 5000 to be adjusted relative to the saddle 4000. The leg angle adjustment system allows the leg assembly 5000 to adopt different angles in order to accommodate different bicycle frames. The leg angle adjustment system also allows the leg assembly 5000 to adopt a stowed position, in which the legs 5100 are folded against the crossbar, so as to be substantially in line with the crossbar to minimise the profile of the seating system so that the seating system 1000 can be easily stored or removed from the bike while minimizing the likely hood of the assembly touching the bike frame.

For example, the leg attachment members 3200 may be configured to, at least partially, rotate in relation to the central body 3100. Rotating the leg attachment members 3200 varies the angle of the leg connector 3220 relative to the central body 3100 and relative to the saddle 4000. Varying the angle of the leg connector 3220 varies the angle at which the leg assembly 5000 extends from the hub assembly 3000 (and saddle 4000). In these forms, the face plate 3210 of each of the leg attachment members 3200a, 3200b may be rotatably attachable to the central body 3100.

In some forms, the face plate 3210 comprises a plate-like structure, which allows the rotatable face plate to fit neatly between the central body 3100 and the adjacent saddle attachment member 3400. The face plate 3210 comprises an inner surface 3211 and an outer surface 3212. The face plate 3210 may also comprise an attachment feature 3215 that projects from the inner surface 3211 and is configured to pass through an attachment aperture 3125 of the central body 3100 and engage with the attachment feature 3215 of the other leg attachment member 3200a, 3200b, located on the other side of the central body 3100. In some forms, each connection feature 3125 comprises a hollow protrusion/shaft that forms a rotatable axle of the respective leg attachment members 3200a 3200b and that attaches the leg attachment members 3200a, 3200b together on either side of the central body 3100. Optionally, each attachment feature/shaft 3215a, 3215b is substantially centrally located on the respective face plate 3210. The leg attachment members 3200a, 3200b may therefore engage with each other to rotate freely and simultaneously about the central body 3100.

In some forms, the shafts 3125a, 3125b of each leg attachment member 3200a, 3200b are configured to be keyed and/or to mate together. For example, the shaft 3125 of one of the leg attachment members 3200a, 3200b may be shaped and dimensioned to be snugly received within the shaft 3125 of the other leg attachment member. In some forms, each shaft is substantially hollow. Optionally, a first shaft 3215a of the first leg attachment member 3200a comprises a substantially circular outer periphery to form a cylindrical exterior profile and a second shaft 3215b of the second leg attachment member 3200b comprises a tapered, circular exterior periphery to form a substantially frustoconical profile. In this form, the frustoconical shaft may be dimensioned to be pushed into the hollow interior of the cylindrical shaft to connect the two shafts together by a friction fit. In other forms, the first shaft 3215a may comprise any suitable exterior profile. In some forms, the first shaft 3215a comprises a cylindrical or frustoconical exterior profile and also comprises a keyed interior, shaped and dimensioned to receive the second shaft 3215b, which comprises an exterior profile that is of a substantially corresponding shape and dimension to the keyed interior of the first shaft 3215a. For example, the keyed interior of the first shaft 3215a may comprise a substantially rectangular shape to receive therein a second shaft 3215b comprising a substantially rectangular exterior profile, as shown in FIG. 3. Typically, the keyed interior of the first shaft 3215a has a shape that comprises one or more corners, such as a square, rectangular, pentagonal, hexagonal, or octagonal shape, or the like, and the exterior periphery of the second shaft 3215b comprises substantially the same shape so that the two shafts 3215a, 3215b can be keyed together so that the leg attachment members 3200a, 3200b engage with each other in order to rotate simultaneously, thereby rotating both legs 5100 of the leg assembly 5000 simultaneously.

Each leg attachment member 3200a, 3200b may also comprise a slider 3214 that projects from the face plate 3210 and is configured to slide along the guide path 3123 of the central body 3100 as the face plate 3210 rotates. In some forms, the slider 3214 projects from the inner surface 3211 of the face plate 3210, or from an outer edge of the face plate, as shown in FIG. 2. The face plate 3210 reaches the maximum point of rotation when the slider 3214 abuts one of the limit stops 3124a, 3124b at each end of the guide path 3123. In this way, the slider 3214 and guide path 3123 together control the extent to which the leg assembly 5000 can be angled relative to the saddle 4000. Typically, the leg angle adjustment system is configured to prevent the leg assembly 5000 being rotated such that the foot supports 5200 project above the saddle 4000.

Figure 4B:
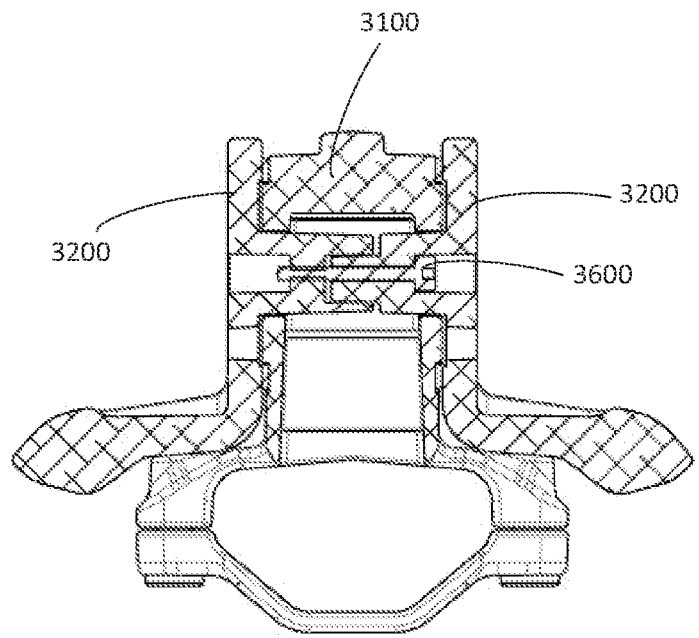
FIG. 4B is a cross-sectional view through line A-A of FIG. 4A and showing the leg attachment members attached together.

In some forms, as shown in FIGS. 3 to 4B, each leg attachment member 3200a, 3200b may also be securely attached to the other leg attachment member 3200a, 3200b and the central body 3100. In some forms, each face plate 3210 may comprise an attachment aperture 3217 that extends between the inner surface 3211 and the outer surface 3212 of the face plate 3210 and that substantially aligns with at least a central portion of the attachment aperture 3125 of the central body 3100. In some forms, each attachment aperture 3217 is generally centrally located within the shaft 3215 of the respective face plate 3210 such that the shaft 3215, the attachment aperture 3217, and the attachment aperture 3125 are substantially concentrically arranged and comprise the same central axis. Each attachment aperture 3217 may be configured to receive a fastener 3600, such as a threaded rod or bolt, to secure the leg attachment members 3200 to the central body 3100. For example, the fastener may extend through the attachment aperture 3217 of the first leg attachment member 3200a, through the attachment aperture 3125 of the central body 3100, and through the attachment aperture 3217 of the second leg attachment member 3200b on the other side of the body 3100. The fastener may then be secured in position, such as with one or more nuts, to attach each face plate 3210 (and therefore each leg attachment member 3200a, 3200b) to the central body 3100. The central body 3100 is located centrally between the face plates 3210 of each leg attachment member 3200a, 3200b.

In this arrangement, the leg attachment members 3200 are securely attached to the central body but are free to rotate simultaneously relative to the body 3100. Typically, the fastener 3600 defines the central axis of rotation/central rotational axis of the leg attachment members 3200 "X" of the leg attachment members 3200, as shown in FIG. 3.

Figure 5A:
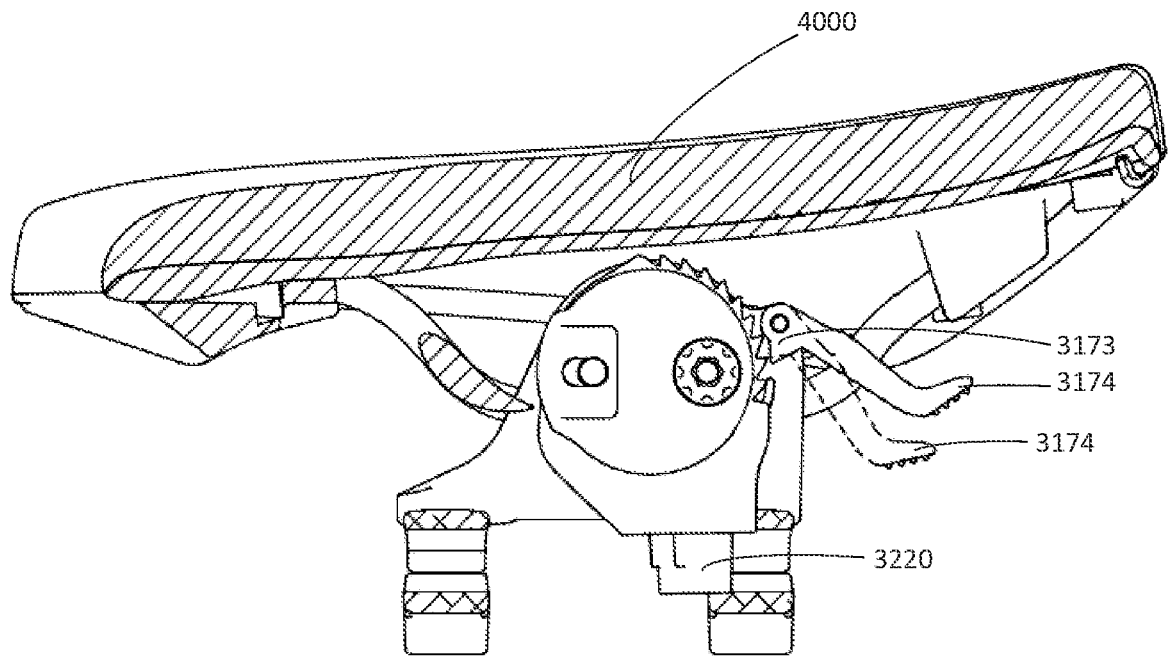
FIG. 5A is a partial cut away view showing a leg attachment member in a first position in which the leg connector is projecting substantially downward.
Figure 5B:
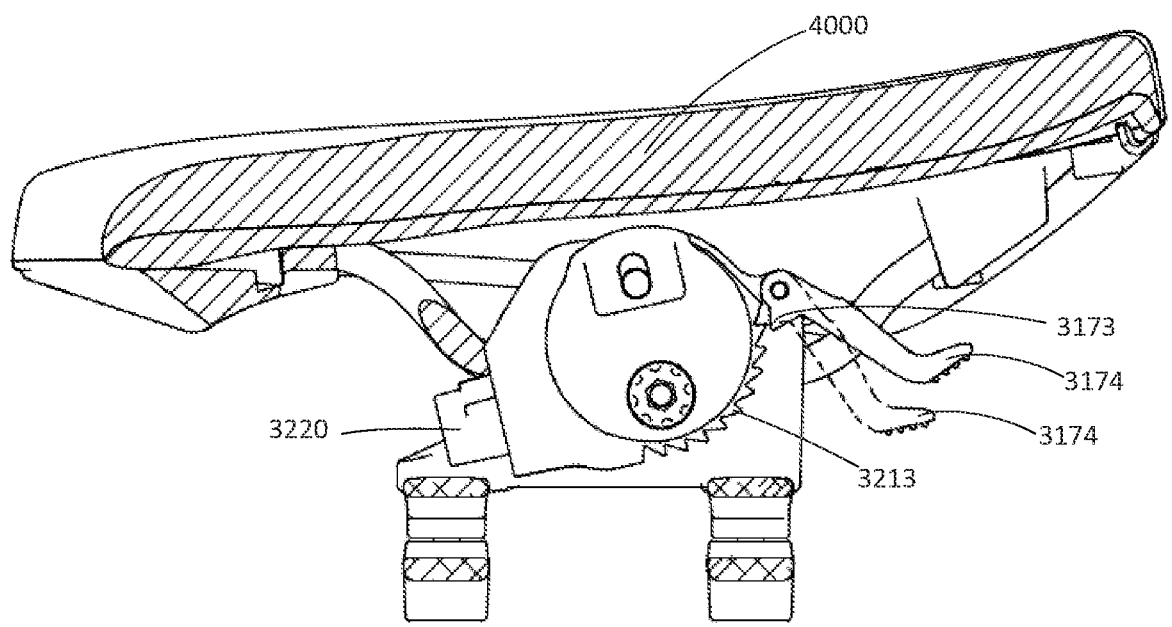
FIG. 5B shows the leg attachment member of FIG. 5A in which the leg attachment member has been rotated to adjust the position of the leg assembly, the leg connector now projecting substantially forward.

In some forms, the system 1000 comprises a locking mechanism to lock the angle of the leg assembly 5000 in a desired position. For example, as shown in FIGS. 3, 5A and 5B, each leg attachment member 3200a, 3200b may comprise an engagement feature 3213 configured to engage with and disengage from the catch 3173 of the leg locking lever 3170, in order to lock the leg assembly 5000 in a desired position and to unlock the leg assembly 5000 to adjust the position of the legs and leg assembly. In some forms, the engagement feature 3213 comprises a toothed rack. The rack 3213 is preferably curved about the central rotational axis of the leg attachment member and comprises a plurality of teeth for engaging with the catch/pawl 3173 of the central body 3100 to form a ratchet-like mechanism. In some forms, the curved rack 3213 is located on a rear portion of the face plate 3210, such as on a rear edge of the face plate 3210, and proximate the catch 3173 of the leg locking lever 3170 located at the rear of the central body 3100. In some forms, the teeth of the rack 3213 each comprise an end face that is substantially radial from the central axis of rotation of the face plate 3210 and respective leg attachment member 3200. Each tooth may also comprise an inclined face that meets the end face at an apex and slopes away from the apex in a first direction, as shown in FIGS. 5A to 5B. In some forms, the sloping surface of each tooth is generally inclined in the upward or anti-clockwise direction. In this arrangement, the face plate can readily rotate in one direction (such as clockwise) beneath the catch 3173 of the locking lever 3170, but is prevented from rotating in the reverse direction (such as the anti-clockwise direction) because the catch 3173, biased toward the locked position, jams against an end face of an adjacent one of the teeth, locking the leg attachment members 3200a, 3200b (and therefore the leg assembly 5000) in position. The leg attachment members 3200a, 3200b may be unlocked by rotating the leg locking lever 3170 about the pivot shaft 3172 to disengage the catch 3173 from the toothed rack 3213, such as by lifting the second end of the lever 3170. The leg assembly 5000 can then be rotated forward or backward to the desired angle relative to the saddle 4000. When the leg assembly 5000 is in the desired position, the leg locking lever 3170 can be released. Upon release, the biasing member 3180 causes the lever 3170 to return to the locked position in which the catch 3173 engages with an adjacent one of the teeth of the rack 3213. FIGS. 5A and 5B show the lever 3170 and catch 3173 in solid lines when in the unlocked position and in broken lines when in the locked position. In some forms, the lever 3170 comprises a pair of catches 3173 in which one catch 3173 is located on either side of the central body 3100, so that each catch 3173 engages with a respective leg attachment member 3200 simultaneously and also disengages with the respective leg attachment member 3200 simultaneously when moved to the unlocked position. This arrangement balances the locking mechanism of the leg assembly 5000 and helps prevent the leg assembly 5000 from twisting when locked.

In some forms, each leg attachment member 3200a, 3200b also comprises at least one arcuate saddle angle adjustment slot 3218 located on the face plate 3210 in alignment with a corresponding arcuate saddle angle adjustment slot 3121 of the central body 3100. In some forms, the face plate 3210 comprises a pair of arcuate saddle angle adjustment slots 3218a, 3218b that curve around the central axis of rotation of the face plate 3210 and attachment aperture 3217 such that each of the slots 3218a, 3218b has an equal radius.

FIG. 6 shows one form of leg assembly 5000 that is attachable to the hub assembly 3000. The leg assembly 5000 comprises a pair of legs 5100 that each comprise a first end configured to attach to a respective leg connector 3220 of the hub assembly 3000 by any suitable arrangement. In some forms, a lower surface of each leg connector 3220 comprises a threaded aperture 3225, and the first end portion of each leg also comprises an aperture 5105. A threaded fastener 5150 may be inserted within the apertures 3225 and 5105 to engage with both the leg 5100 and the leg connector 3220 in order to attach the leg 5100 to the hub assembly 3000. In other forms, the leg connector 3220 may be threaded and the interior of the first end of the leg 5100 may be threaded so that the leg may be directly screwed onto the leg connector 3220 to attach the leg 5100 to the hub assembly 3000.

Figure 7:
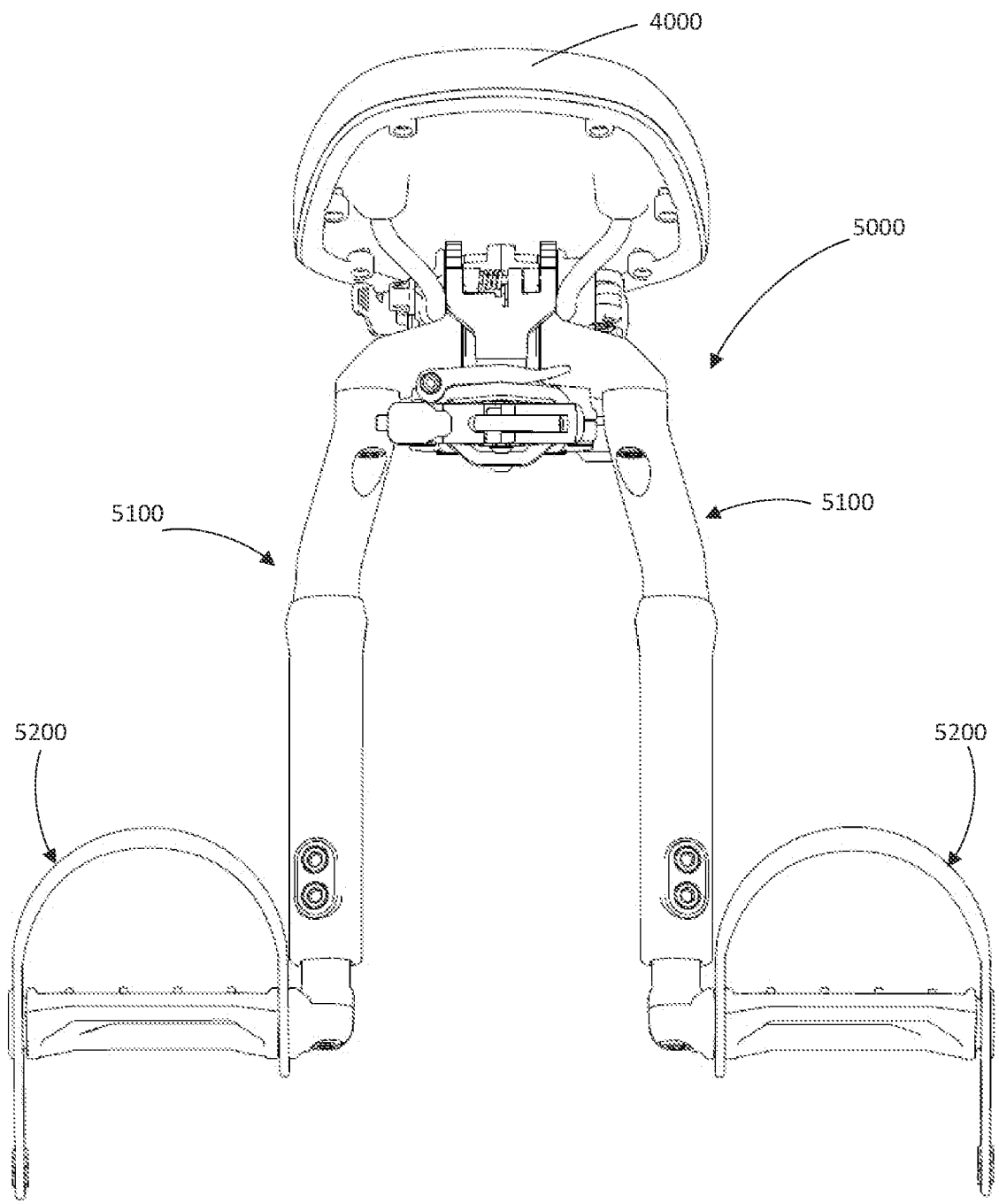
FIG. 7 is a rear view of the seat assembly in a neutral position.
Figure 7A:
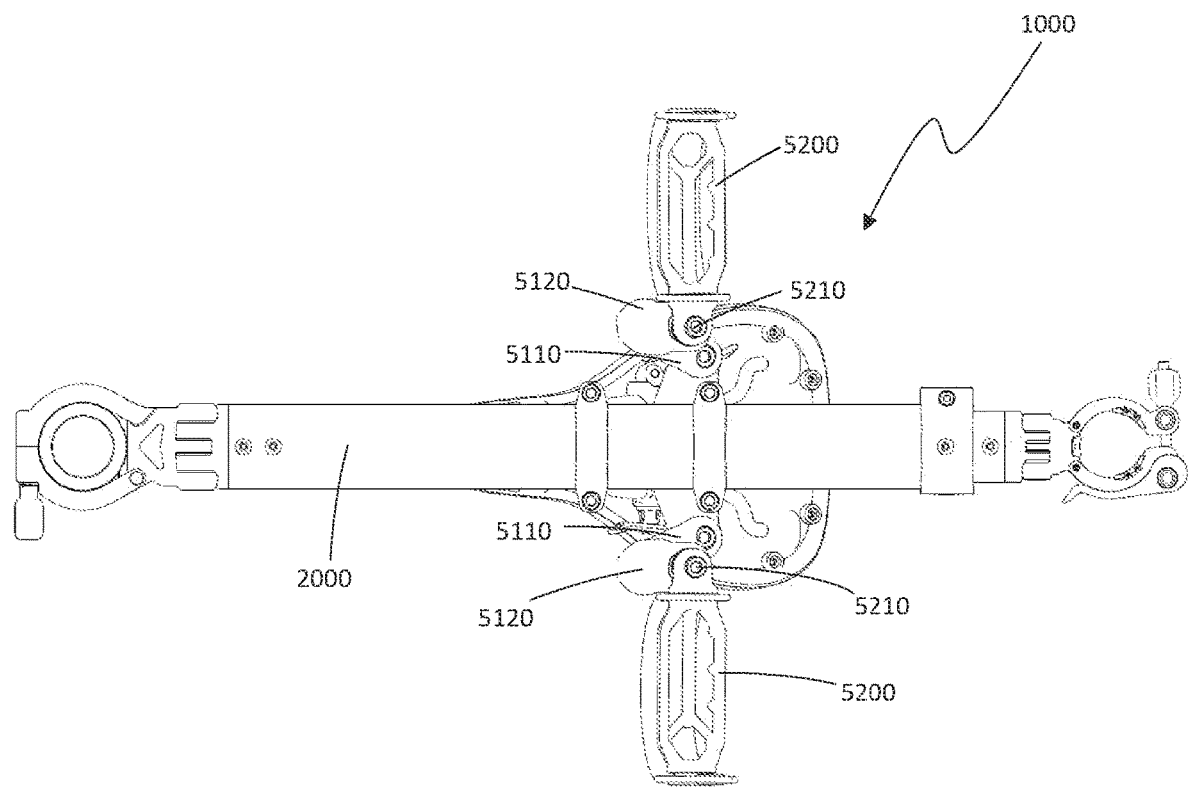
FIG. 7A is a bottom view of the seat assembly of FIG. 7.
Figure 8:
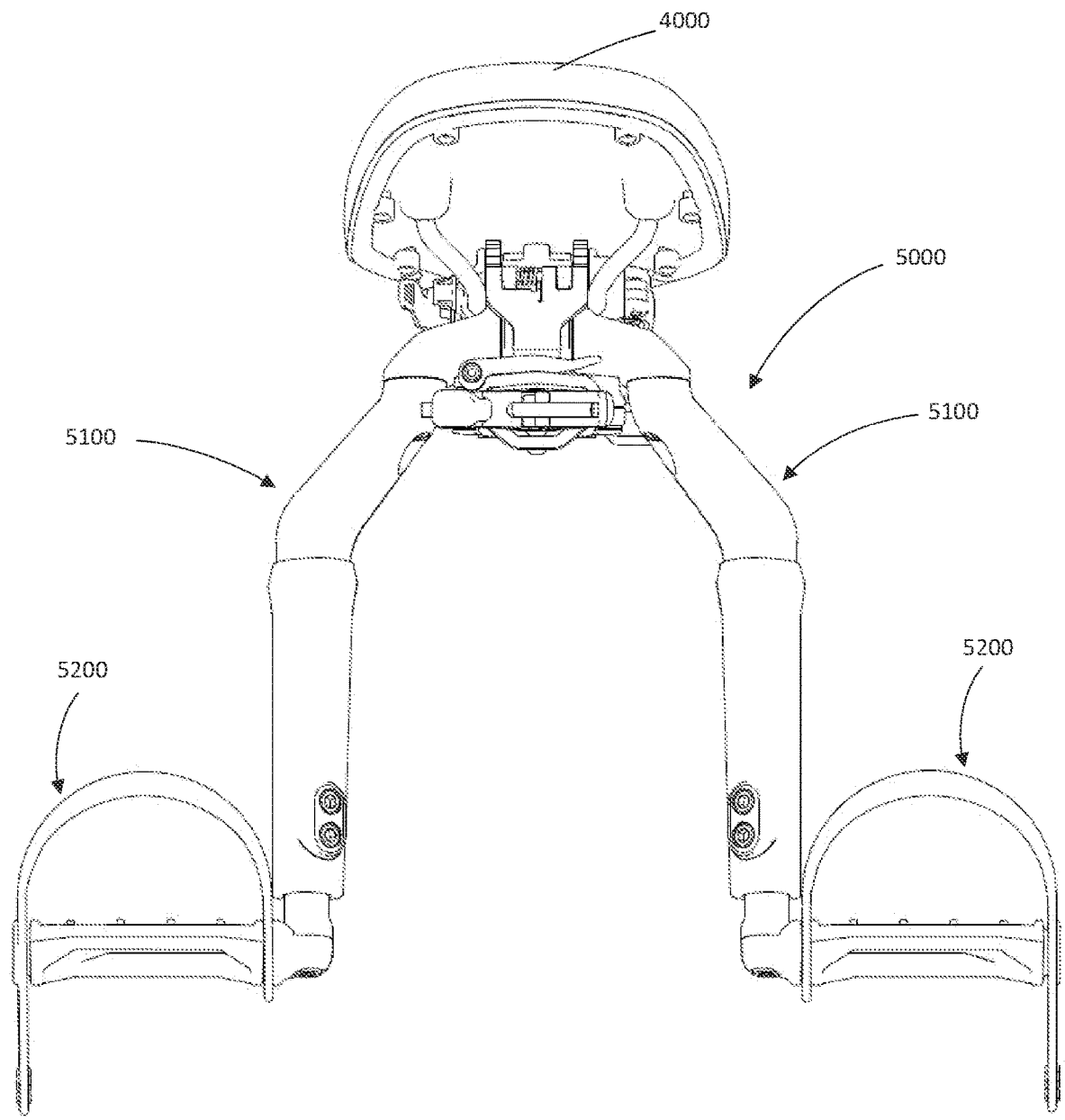
FIG. 8 is a rear view of the seat assembly in a splayed position.
Figure 8A:
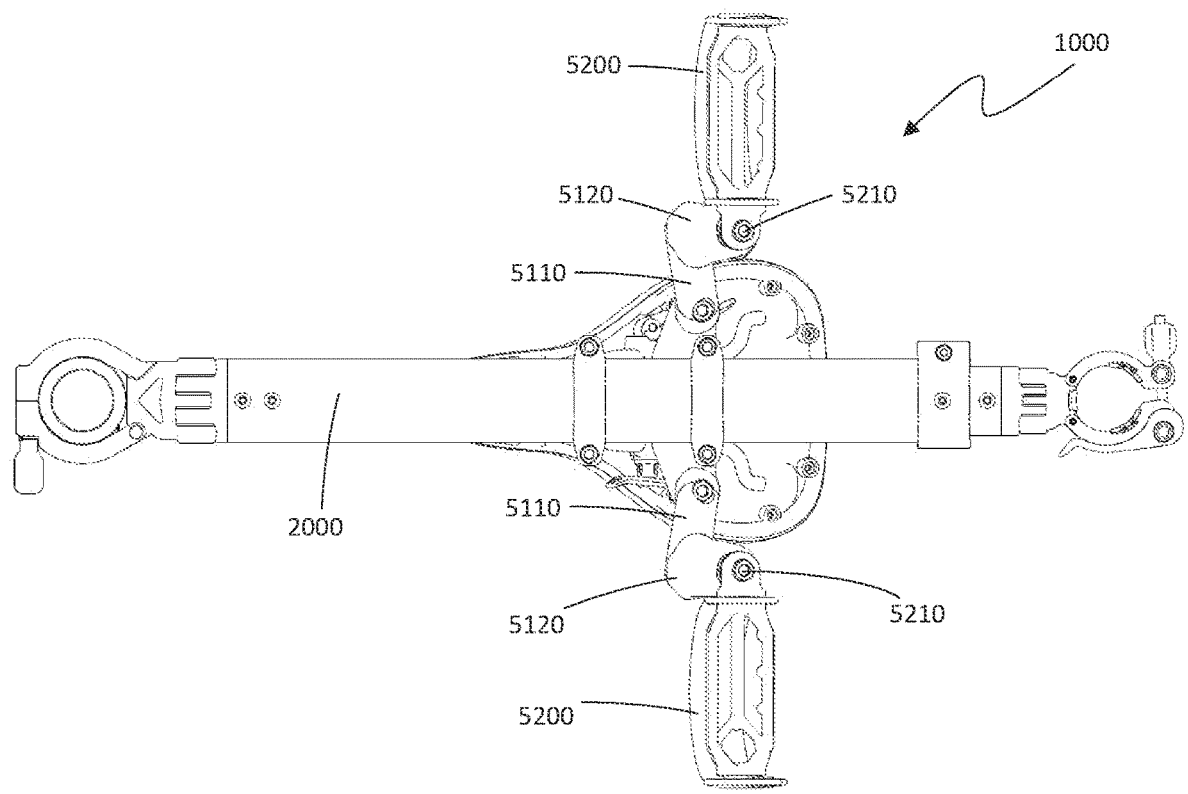
FIG. 8A is a bottom view of the seat assembly of FIG. 8.

In some forms, the leg assembly 5000 is adjustable between a neutral, non-splayed position and a splayed position, as shown in FIGS. 7 and 8. In these forms, each leg connector is attachable to the respective leg in a first, neutral position, and in a second, splayed position, in which the legs are splayed apart. The splayed position is useful when the seating system 1000 is mounted on an electric bicycle because it allows the legs 5100 of the leg assembly 5000 to spread apart to provide clearance around the wide frame and battery of an electric bicycle, for example. The non-splayed, neutral position is commonly used when the seating system 1000 is mounted on a standard, non-electric bicycle. FIGS. 7, 7A and 8, 8A show the leg assembly in the neutral, non-splayed position and in the splayed position respectively. In some forms, each leg 5100 comprises an upper portion 5110 and a lower portion 5120. The upper portion 5110 connects to the lower portion 5120 at an angle to form a bend or knee 5115. In this arrangement, when the upper portion 5110 and knee 5115 faces forward, the legs 5100 are in the non-splayed position, as shown in FIGS. 7 and 7A, but when each leg 5100 is rotated so that the upper portion 5110 and knee 5115 faces outward, the legs 5100 are in the splayed position, as shown in FIGS. 8 and 8A. In some forms, the foot support 5200 is rotatable relative to the lower portion 5120 so that the foot support 5200 can be adjusted to be substantially perpendicular to the longitudinal direction of the crossbar 2000 regardless of whether or not the legs 5100 are splayed. In some forms, the foot support 5200 is moveable between: a first position, in which the foot support 5200 extends in a direction substantially perpendicular to the longitudinal direction of the crossbar 2000 when the legs 5100 are in the neutral, non-splayed position; and a second position, in which the foot support 5200 also extends in a direction substantially perpendicular to the longitudinal direction of the crossbar 2000 when the legs 5100 are in the splayed position. The leg assembly 5000 may comprise a locking system to lock each foot support 5200 in a desired position relative to the lower portion 5120 of the respective leg 5100. The foot support 5200 may be locked in the first or second position by any suitable locking system. For example, the foot support 5200 and lower portion 5120 of the leg may comprise alignment members to guide the position of the foot support 5200 and then the foot support 5200 may be screwed in place by inserting a screw 5210 within an opening of the foot support 5200 and into a corresponding opening at the tip of the distal end of the lower portion 5210, as shown in FIGS. 7A and 8A. In another form, the locking system may comprise a compressible pin located on a shaft of the foot support 5200 that is received within the lower portion 5120 of the leg 5100. The lower portion of the leg may comprise at least two substantially aligned holes extending around the circumference of the lower portion 5120, one of the holes being located to align with the pin when the foot support 5200 is in the first position and the other of the holes being located to align with the pin when the foot support 5200 is in the second position. The foot support may be moveable between the first and second positions, by depressing the pin and rotating the foot support 5200 until it reaches the desired position, at which point the pin will engage with the corresponding hole on the lower portion 5120 of the leg 5100.

The leg assembly 5000, and therefore the legs 5100, may be moved between the splayed and non-splayed position by any suitable arrangement. In some forms, each leg connector 3220 and each leg 5100 may comprise alignment features that guide the position in which the leg 5100 is attached to the leg connector 3220. For example, engagement between one pair of alignment features may position the upper portion 5110 of the leg 5100 to face forward so that the leg assembly 5000 adopts the neutral position, whereas engagement between another pair of alignment features may position the upper portion 5110 of the leg to face outwardly so that the leg assembly 5000 adopts the splayed position.

In some forms, each leg connector 3220 may comprise at least two alignment features 3221, each alignment feature 3221 being configured to engage with at least one complimentary alignment feature provided on the respective leg 5100, so that engagement of the leg 5100 with one of the alignment features 3221 locates the leg 5100 in a splayed position and engagement of the leg 5100 with another of the alignment features 3221 locates the leg 5100 in the neutral, non-splayed position. Alternatively, each leg 5100 comprises at least two alignment features, each alignment feature being configured to engage with a complimentary alignment feature 3221 provided on the leg connector 3220, such that the engagement of the leg connector 3220 with one of the alignment features of the leg 5100 locates the leg 5100 in the splayed position and engagement of the leg connector 3220 with another of the alignment features of the leg locates the leg 5100 in the non-splayed position. In yet another form, each leg connector 3220 and each leg 5100 comprise at least two alignment features to allow the leg assembly 5000 and legs 5100 to be adjusted between a splayed position and a non-splayed position.

In one form, the alignment feature(s) 3221 of the leg connector 3220 comprise protrusions and the alignment feature(s) of the leg 5100 comprise recesses for engaging with the protrusions to locate the leg assembly 5000 in a splayed position or a non-splayed position. In other forms, the alignment feature(s) 3221 of the leg connector 3220 comprise recesses and the alignment feature(s) of the leg 5100 comprise protrusions for engaging with the recesses to locate the leg assembly 5000 in a splayed position or a non-splayed position.

Once the leg assembly 5000 is located in the desired splayed or non-splayed position, a fastener 5150, such as a screw or bolt, is inserted into an opening 5105 in the upper portion 5110 of the leg 5100 and an opening 3225 in the leg connector 3220 to attach the leg assembly 5000 to the leg connector 3220.

In some forms, as shown in FIG. 6, the legs 5100 of the leg assembly 5000 are length-adjustable so that the distance between the foot support 5200 and the saddle 4000 can be increased or decreased depending on the height of the child using the seating system 1000. For example, the lower portion 5120 of the leg may comprise a telescoping arrangement to adjust the length of the lower portion between an extended position and a retracted/non-extended position. In some forms, the lower portion 5120 of each leg 5100 may comprise a first element 5121 and a second element 5122. The second element 5122 may be slidable up and down along at least a portion of the length of the first element 5121 to extend or reduce the length of the lower portion 5120 of the leg. In some forms, the second element 5122 is slidably received within a hollow portion of the first element 5121 to adjust the length of the leg 5100.

The length-adjustable legs 5100 may also comprise a locking system to lock the position of the second element 5122 relative to the first element 5121. Any suitable locking system may be employed, as will be appreciated by a person skilled in the art. In some forms, the second element 5122 comprises at least one compressible member that projects from an outer surface of the second element, and the first element 5121 comprises a series of aligned holes/apertures that extend along a portion of the length of the first element 5121. Each of the holes/apertures is sized and shaped to receive the compressible member therein so that a user can slide the second element 5122 relative to the first element 5121 until the leg 5100 is of the desired length, at which point the user aligns the compressible member with an adjacent hole to cause the compressible member to project through the hole and lock the first and second elements 5121, 5122 together at the desired length. To unlock the first and second elements 5121, 5122 and adjust the length of the leg 5100, a user may depress the compressible member to push the compressible member out of the selected hole and into a hollow of the second element 5122. The user may then slide the second element 5122 relative to the first element 5121 until the desired leg length is obtained, at which point the user may again align the compressible member with an adjacent hole in the first element 5121 to engage the compressible member with the hole and lock the first and second elements 5121, 5122 in position. In another form, the first element 5121 is received within a hollow portion of the second element 5122, in which case the locking system as described above may operate in reverse by providing a first element 5121 comprising a compressible member and a second element 5122 comprising a series of holes/apertures that extend along a portion of the length of the second element 5122.

Each leg 5100 of the leg assembly 5000 may also comprise a foot support/footrest/stirrup 5200, located at or near a second, distal end of the lower portion 5120 of the leg. The foot support 5200 comprises a footplate 5210 on which a child may rest his or her foot. The footplate 5210 may be attached to the leg 5100 by any suitable form of attachment, such as by a fastener that attaches the footplate to the distal end of the lower portion 5120 of the leg 5100. The foot support 5200 may optionally also comprise a footguard 5220 that is configured to prevent the child's foot from slipping sideways or forward off the footplate 5210. In some forms, the footguard 5220 is a strap configured to extend over the top of the child's foot from one side of the footplate 5210 to the other.

In some forms, as shown in FIGS. 9 to 15B, the hub assembly 3000 also comprises a pair of first and second saddle attachment members 3400a, 3400b for attaching the saddle 4000 to the hub assembly 3000. The saddle 4000 may comprise a pair of rails 4200 that extend beneath a seat cushion 4100 of the saddle 4000 and that allow the saddle to be attached to the hub assembly 3000 in a way that avoids interference with the suspension and cushioning characteristics of the saddle 4000. Typically, each saddle rail 4200 extends substantially longitudinally from front to back of the saddle 4000 and comprises an attachment portion 4200a for attaching to a respective saddle attachment member 3400a, 3400b. Optionally, the saddle attachment portion 4200a comprises a substantially straight portion of the saddle rail 4200.

Each saddle attachment member 3400a, 3400b may comprise a body having an inner surface 3411 that faces toward the hub body 3100, when the hub assembly is assembled, and a substantially opposing outer surface 3412 that faces away from the hub body 3100, when assembled. Each saddle attachment member 3400 may also comprise a saddle receiving portion 3420 configured to receive a respective rail 4200 of the saddle. In some forms, the saddle receiving portion 3420 of the attachment member 3400 comprises a channel located on the inner surface 3411 of the saddle attachment member 3400. The channel 3420 is configured to clamp the saddle rail 4200 between the saddle attachment member 3400 and the leg attachment member 3200 of the hub assembly 3000. The channel 3420 may extend in a substantially front to rear direction to substantially align with the saddle rail attachment portion 4200a. The shape of the channel 3420 may substantially correspond with the transverse cross-sectional shape of the rail attachment portion 4200a so that the rail 4200 can fit snugly within the channel 3420. Optionally, the rail 4200 comprises a substantially tubular rod, such that the rail attachment portion 4200a comprises a circular transverse cross-section and the channel 3420 comprises a semi-circular transverse cross-section (or is substantially C-shaped when viewed from the front or from the rear), in order to snugly receive the rail attachment portion 4200a therein, as shown in FIGS. 9 to 12B.

Figure 11A:
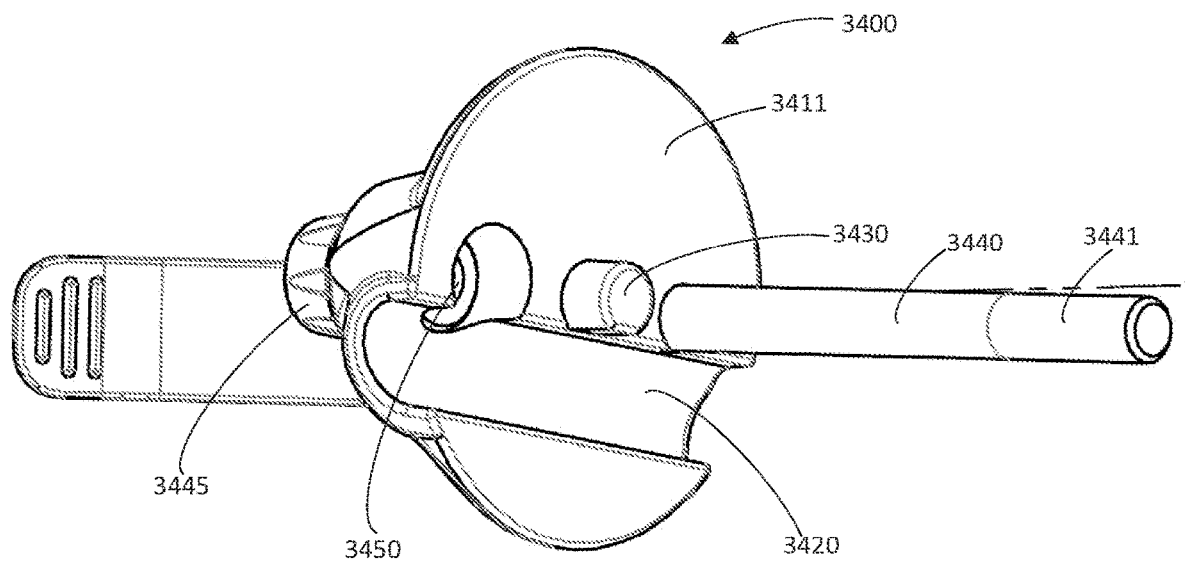
FIGS. 11A and 11B are enlarged isometric views showing one form of saddle attachment member from both the inside and the outside view.
Figure 11B:
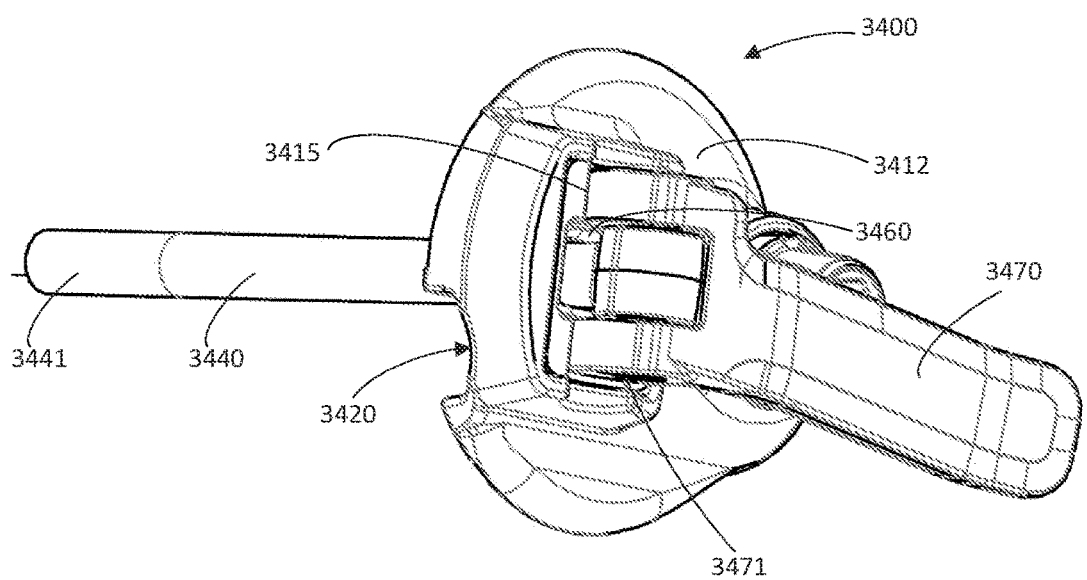
Figure 12A:
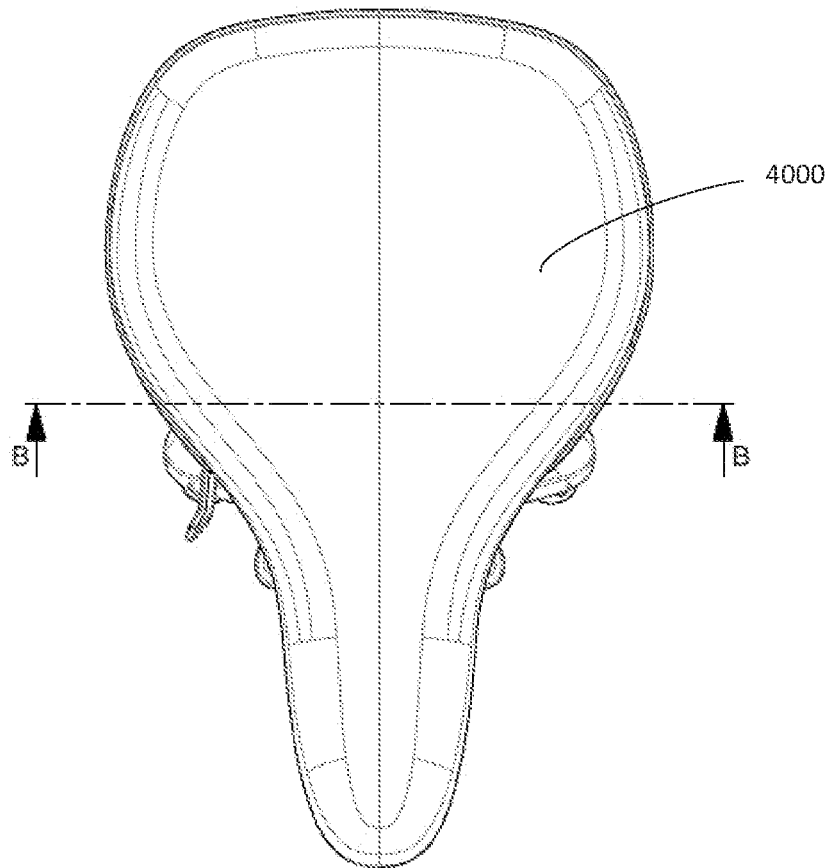
FIG. 12A is a top view of one form of saddle assembly of FIG. 10 in the assembled state.
Figure 12B:
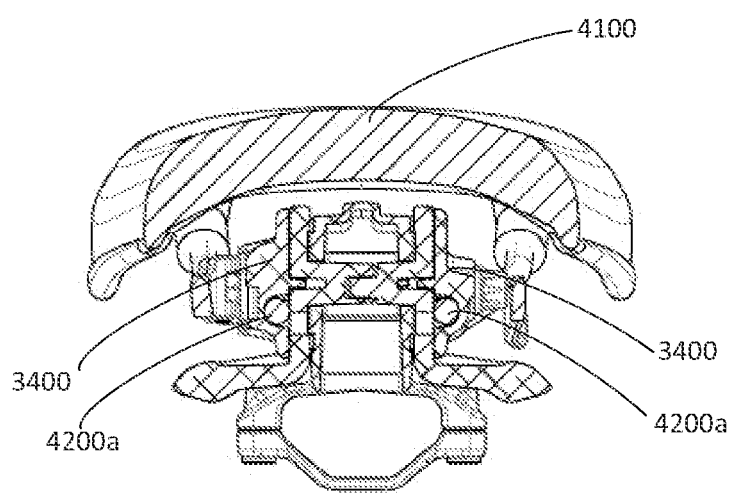
FIG. 12B is a cross-sectional end view through line B-B of FIG. 12A and showing the saddle rails clamped between the saddle attachment members and the leg attachment members.

In some forms, as shown in FIG. 11A, the inner surface 3411 of each saddle attachment member 3400 may also comprise a locating element 3430 to locate the saddle attachment member 3400 on the leg attachment member 3200 and central body 3100 of the connection hub assembly 3000. The locating element 3430 defines a central rotational axis of the saddle attachment member 3400. In some forms, the central rotational axis of the saddle attachment members 3400a, 3400b is equivalent to the central rotational axis of the leg attachment members 3200a, 3200b. In some forms, the locating element 3430 of each member 3400a, 3400b comprises a projection, such as a cylindrical or frustoconical boss, that projects from the inner surface 3411 of the saddle attachment member 3400a, 3400b and into the attachment aperture 3217 of the face plate 3210 of the respective leg attachment member 3200a, 3200b to locate the saddle attachment member 3400a, 3400b on the leg attachment member 3200a, 3200b.

Each saddle attachment member 3400a, 3400b may comprise a locking system to lock the saddle attachment member to the adjacent leg attachment member 3200a, 3200b and to the central body 3100. In some forms, the hub assembly 3000 comprises a saddle angle adjustment system of which the locking system is a part of. The locking system may comprise at least one locking pin that is attached to both saddle attachment members 3400a, 3400b and that engages with the leg attachment members 3200a, 3200b and the central body 3100 to allow the angle of the saddle 4000 to be adjusted relative to the crossbar 2000 as the saddle attachment members rotate relative to the central body 3100.

In some forms, to allow adjustment of the saddle angle, each saddle attachment member 3400a, 3400b comprises a locking pin 3440 that projects from the inner surface 3411 of the saddle attachment member and through the aligned arcuate adjustment slot 3218 of the adjacent leg attachment member, and the aligned arcuate adjustment slot 3121 of the central body 3100, then through the aligned arcuate adjustment slot 3218 of the other leg attachment member and through a first pin receiving opening 3450 of the other saddle attachment member 3400. The locking pin 3440 is then secured in position with at least one fastener to lock the saddle attachment members 3400a, 3400b to each other and to the other components 3100, 3200 of the hub assembly 3000. In some forms, the locking pin 3440 comprises a threaded distal end portion 3441 that engages with a threaded fastener 3445, such as a nut, on the outer surface 3412 of the other saddle attachment member 3400 to attach both saddle attachment members 3400a, 3400b to the leg attachment members 3200a, 3200b and the central hub body 3100. In other forms, the first pin receiving aperture 3450 may comprise a threaded interior configured to engage with the threaded distal end portion 3441 of the locking pin to attach the saddle attachment members 3400a, 3400b to the leg attachment members 3200a, 3200b and the central hub body 3100 of the hub assembly 3000.

Figure 13A:
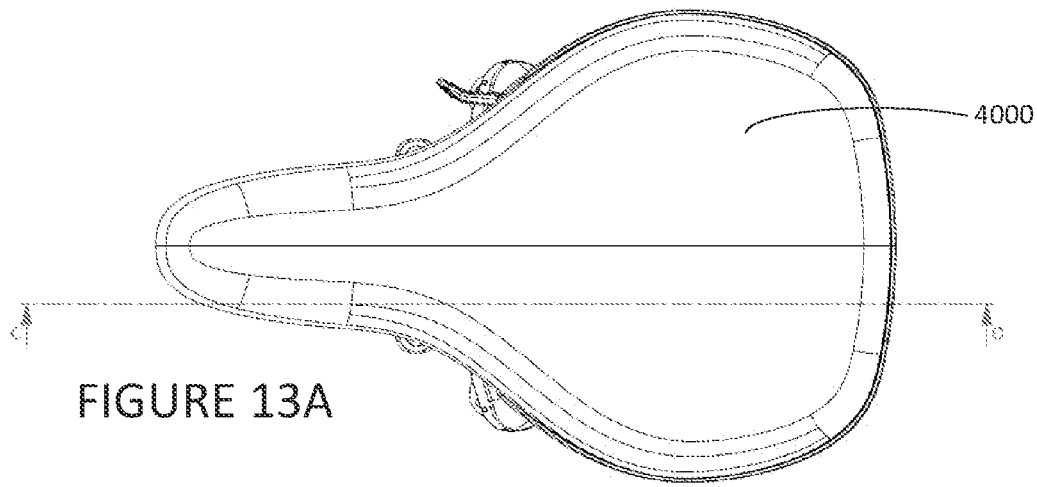
FIG. 13A is another top view of the saddle assembly of FIG. 3.
Figure 13B:
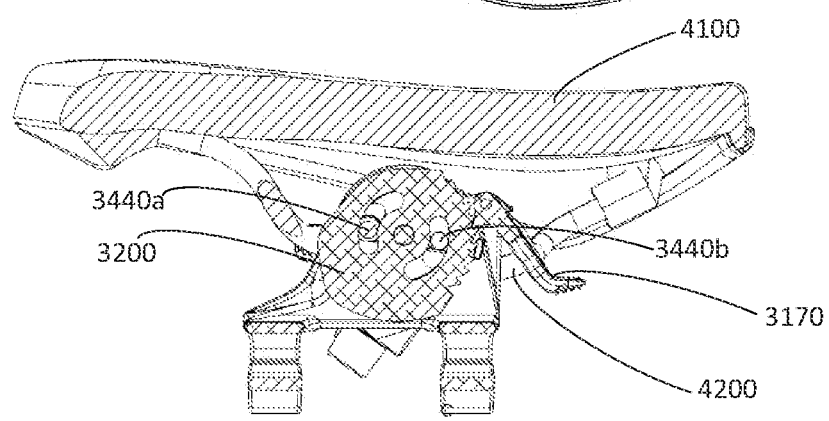
FIG. 13B is a cross-sectional side view through line C-C of FIG. 13A and showing the saddle in a substantially horizontal position and the leg connector angled forward.
Figure 13C:
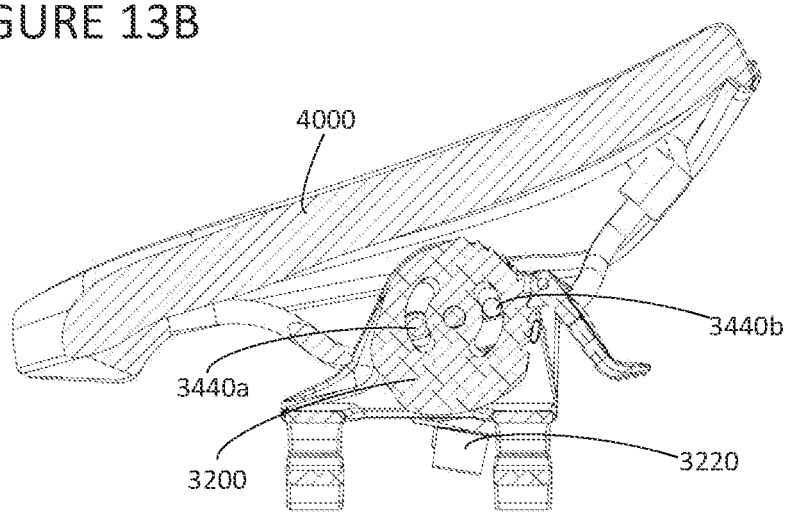
FIG. 13C is another cross-sectional side view through line C-C of FIG. 13A and showing the saddle tilted forward and the leg connector angled substantially downward.
Figure 15A:
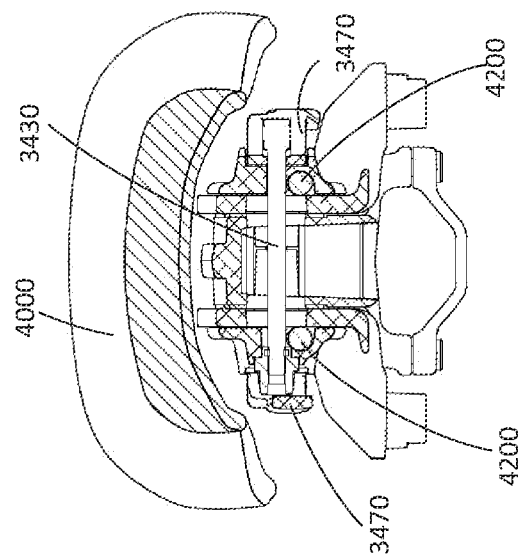
FIG. 15A is a cut-away end view of the saddle assembly of FIG. 14A in which the quick release levers of the saddle attachment members in the open position.
Figure 15B:
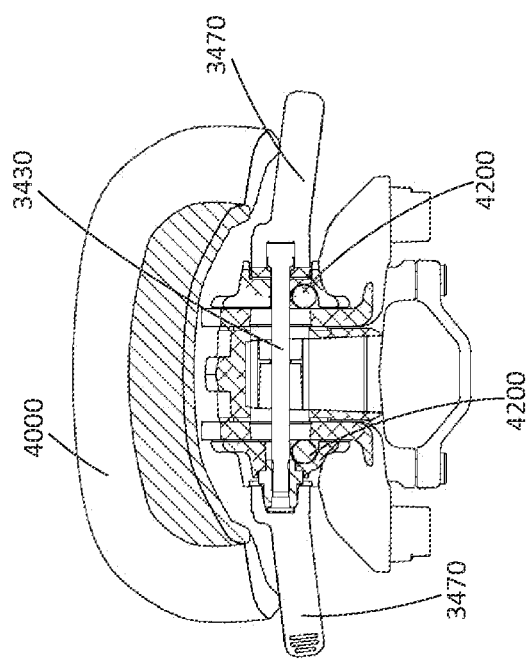
FIG. 15B is a cut-away end view of the seat assembly of FIG. 14A in which the quick release levers of the saddle attachment members in the closed position.

In some forms, as shown in FIGS. 9 and 13A to 13C, the central body 3100 and leg attachment members 3200 each comprise two arcuate adjustment slots 3121a, 3121b, 3218a, 3218b that are spaced equidistant around the central rotational axis defined by the central apertures 3217 and 3125 of the leg attachment members 3200a, 3200b and the central body 3100. In these forms, each saddle attachment member 3400a, 3400b comprises a locking pin 3440 that projects from the inner surface 3411 of the saddle attachment member 3400. Each locking pin 3440 may comprise a threaded distal end 3441 and each saddle attachment member 3400a, 3400b may comprise a first pin receiving aperture 3450 for receiving a portion of the locking pin 3440 of the other saddle attachment member. Optionally, the locking pin 3440 of the first saddle attachment member 3400a extends from one side region of the inner surface 3411, such as a front region or hemisphere, and the first pin receiving opening 3450 is located on the opposite side region of the inner surface 3411, such as a rear region or hemisphere, as shown in FIG. 11A. In this arrangement, the locking pin 3440 of the second saddle attachment member 3400b extends from the other side region of the inner surface 3411, such as a rear region or hemisphere, and the first pin receiving opening 3450 is located on the opposite side region of the inner surface 3411, such as a front region or hemisphere, as shown in FIG. 11A. Each locking pin 3450 projects through a respective one of the two arcuate adjustment slots 3218a, 3218b, 3121a, 3121b, as shown in FIGS. 13A to 13C. In some forms, the threaded distal end portion 3441 of each locking pin extends through the pin aperture 3450 of the other saddle attachment member and projects from the outer surface 3412 of that other saddle attachment member 3400. A threaded fastener 3445, such as a nut, engages with the distal end portion 3441 to secure the locking pin 3440 in place in order to attach the saddle attachment members 3400a, 3400b to the leg attachment members 3200a, 3200b and the central body 3100. The fastener 3445 is rotatable in one direction to tighten the clamping arrangement between the saddle attachment members 3400a, 3400b and the other components 3100, 3200 of the hub assembly 3000 and to hold the hub assembly under compression. The fastener 3445 is rotatable in the other direction to loosen the clamping arrangement. Optionally, the fastener 3445 comprises a knob for ease of use. The locking system of the saddle attachment members 3400*a*, 3400*b* serves to attach each of the components 3100, 3200, 3400 of the hub assembly 3000 together.

Each saddle attachment member 3400*a*, 3400*b* may be at least partially rotatable about the central rotational axis defined by the locating members 3430. Because the locking pins 3440 attach the saddle attachment members 3400*a*, 3400*b* together and because each pin 3440 is slidable within the respective arcuate adjustment slots 3218*a* and 3121*a* or 3218*b* and 3121*b*, the saddle attachment members 3400*a*, 3400*b* may rotate clockwise or anticlockwise simultaneously and independently of the leg attachment members 3200*a*, 3200*b* and the central body 3100 of the hub assembly.

By rotating the saddle attachment members 3400*a*, 3400*b*, the saddle receiving portion/channel 3420 is rotated, causing the saddle rails to rotate in the same direction and thereby adjusting the angle of the saddle 4000. For example, by rotating the saddle attachment members 3400*a*, 3400*b* anti-clockwise, the saddle 4000 is caused to tilt forward relative to the crossbar 2000. By rotating the saddle attachment members 3400*a*, 3400*b* clockwise, the saddle 4000 is caused to tilt backward relative to the crossbar 2000. The degree at which the saddle is angled/tilted relative to the crossbar 2000 can be varied by the direction and extent to which the saddle attachment members are rotated, as shown in FIGS. 13A to 13C.

Optionally, as shown in FIGS. 14A to 15B, each saddle attachment member 3400*a*, 3400*b* comprises a quick release system to allow a user to readily loosen and tighten the clamping arrangement between the components 3100, 3200, 3400 of the hub assembly, so that the angle of the saddle 4000 can be readily adjusted without the use of tools. In this arrangement, the locking pin 3440 of each saddle attachment member 3400*a*, 3400*b* may comprise a proximal end that projects through a second pin receiving opening 3460 extending between the inner and outer surfaces 3411, 3412 of the saddle attachment member 3400. The proximal end of the locking pin 3440 may attach to a quick release locking lever 3470, typically at the outer surface 3412 of the respective saddle attachment member 3400. The locking lever 3470 is configured to be rotated in one direction to loosen the clamping arrangement of the hub assembly 3000 and to be rotated in the other direction to tighten the clamping arrangement.

In some forms, as shown in FIGS. 14A to 15B, the quick release locking lever 3470 comprises a cam lever that is hingedly attached to the proximal end of the locking pin 3440 and to the saddle attachment member 3400. A first end of the cam lever 3470 comprises a cam that nests within a recess 3415, such as a cam sliding base, located on the outer surface 3412 of the saddle attachment member 3400, as shown in FIG. 9. The recess 3415 may comprise a substantially U-shaped channel. The first end of the cam lever 3470 is mounted on a pivot shaft 3471 that allows the cam lever 3470 to rotate between a locked/clamping position and an unlocked/released position. The proximal end of the locking pin 3440 may also be mounted on the pivot shaft 3471.

The quick release system may be configured so that, when the quick release/cam lever 3470 is in the locked position, the larger radius of the cam lies within the recess 3415, placing tension on the lever 3470 and clamping the respective saddle attachment member 3400 tightly against the adjacent leg attachment member 3200, which is in turn clamped against the adjacent side of the central body 3100. The same arrangement applies to the other saddle attachment member 3400 when the cam lever of that member 3400 is in the locked position, thereby clamping the components 3100, 3200, 3400 of the hub assembly 3000 together.

Because the saddle rails 4200 are held between the saddle attachment members 3400*a*, 3400*b* and the leg attachment member 3200*a*, 3200*b*, the clamping of the saddle attachment members to the leg attachment members firmly holds the saddle 4000 in position and at a particular angle.

By rotating the quick release/cam lever 3470 to the unlocked position, the smaller radius of the cam lies within the recess 3415, releasing the compression/clamping force on the components 3100, 3200, 3400 of the hub assembly 3000. In the unlocked position, the saddle attachment members 3400*a*, 3400*b* (and the leg attachment members 3200*a*, 3200*b*) are able to rotate independently of the central body 3100. Therefore, the angle of the saddle 4000 may be adjusted by moving the saddle to a desired angle relative to the crossbar 2000. Movement of the saddle causes the saddle rails 4200 to move accordingly, which causes the saddle attachment members 3400*a*, 3400*b* to simultaneously rotate to accommodate the new saddle position.

Similarly, the angle of the leg assembly 5000 may be adjusted to adopt a desired angle by manipulating the leg locking lever 3170, to release the catch(es) from the respective rack of each leg attachment member 3200*a*, 3200*b*, and then moving the leg assembly to the desired angle relative to the saddle 4000 and crossbar 2000. Once the leg assembly 5000 is in the desired position, the leg locking lever 3170 may be released to engage with the leg attachment members 3200*a*, 3200*b* to lock the leg assembly 5000 in position.

Once the saddle 4000 and leg assembly 5000 are in the desired position, the quick release lever 3470 may be returned to the locked position and the locking system may be further secured by tightening the compression fastener 3445 to increase the clamping force on the components 3100, 3200, 3400 of the hub assembly 3000.

The mounting portion 3110 of the hub assembly 3000 is configured to mount the hub assembly, and therefore the saddle 4000 and leg assembly 5000, to the crossbar 2000 using any suitable mounting system. Optionally, the mounting portion 3110 clamps the hub assembly to the crossbar. In other forms, the mounting portion 3110 is bolted to the crossbar 2000.

Figure 16:
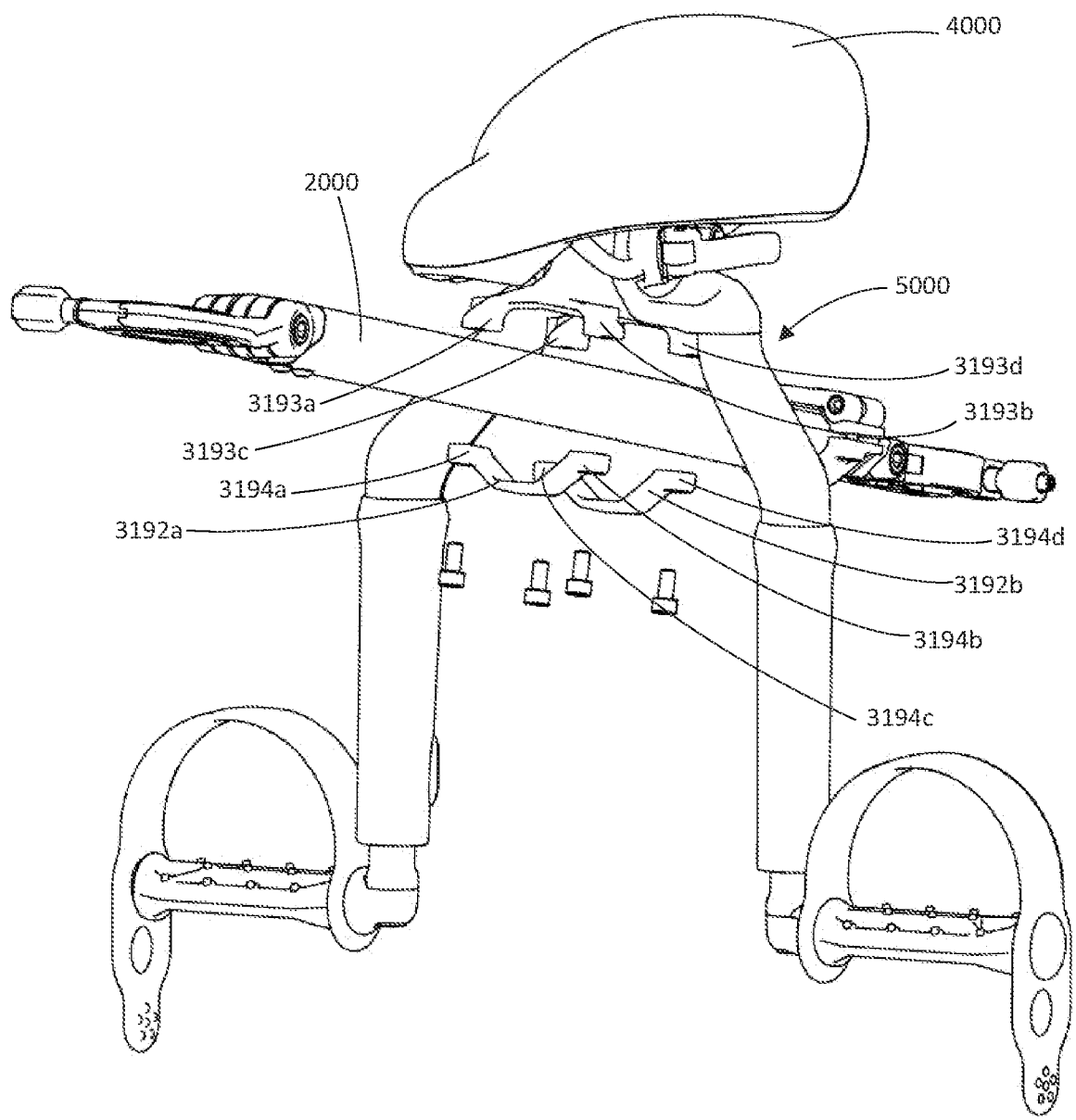
FIG. 16 is a semi-exploded view showing one form of sliding element to attach the seat assembly to a crossbar.
Figure 17:
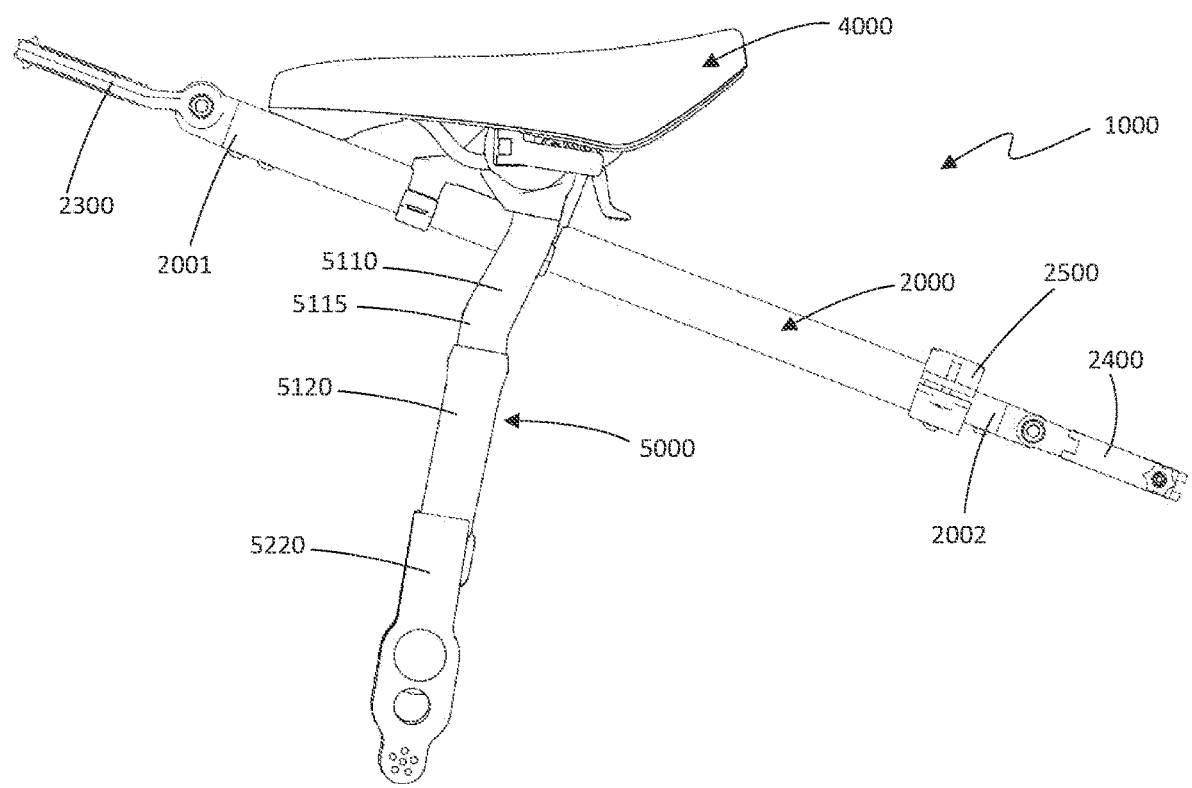
FIG. 17 is a side view showing the seat assembly in one position on a crossbar.
Figure 18:
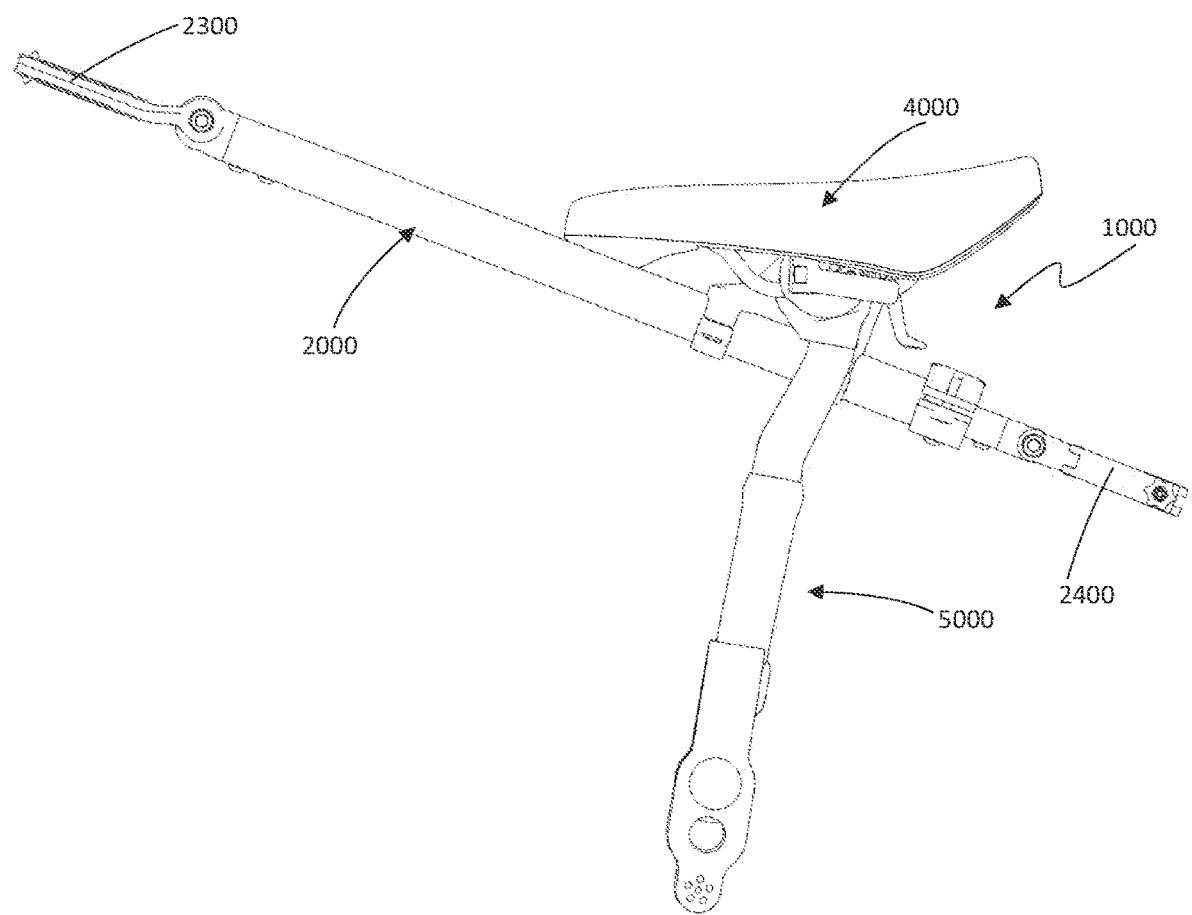
FIG. 18 is a side view showing the seat assembly in another position on a crossbar.
Figure 19:
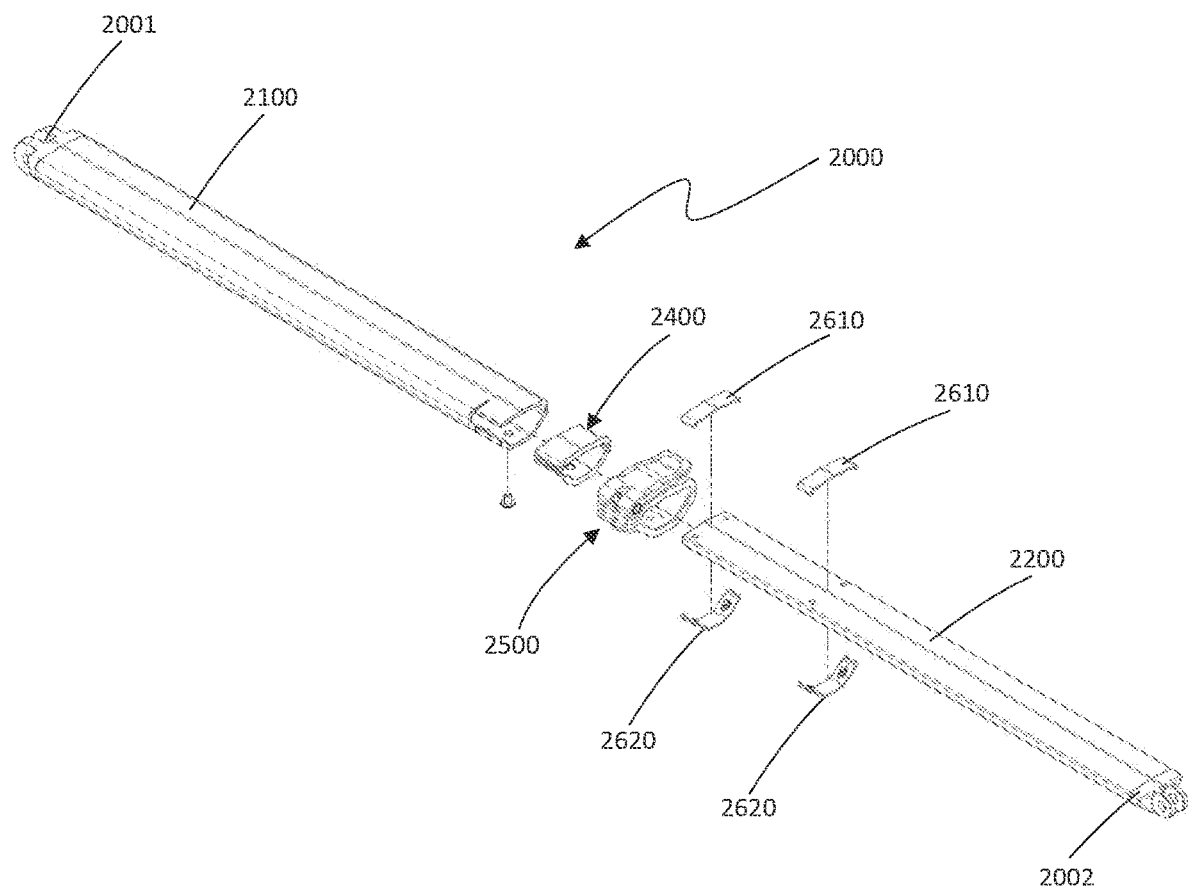
FIG. 19 is an exploded view of one form of extendable crossbar.
Figure 20:
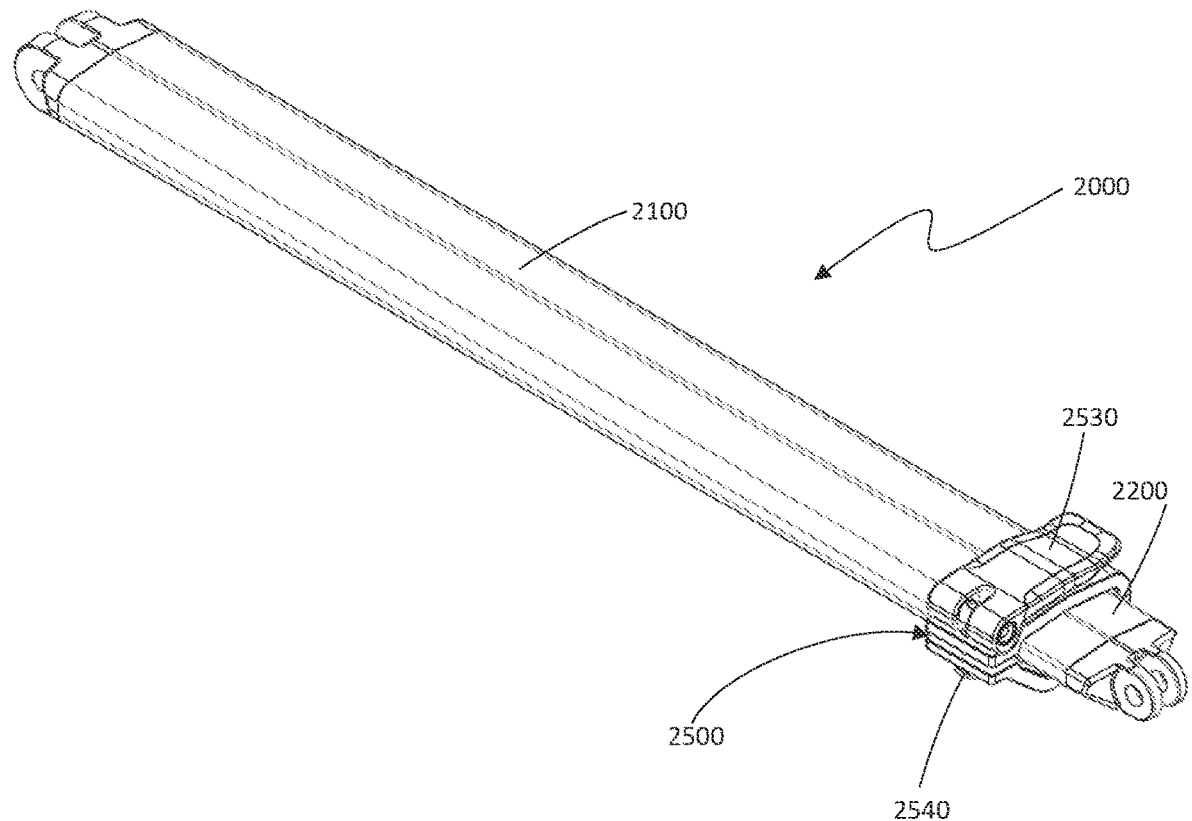
FIG. 20 is an isometric view of the crossbar of FIG. 19 in the assembled state and at the shorted length.

In some forms, the hub assembly 3000 is slidable back and forth along the length of the crossbar 2000 to adjust the position of the saddle 4000 and leg assembly 5000 in relation to the handle bars and saddle of the bicycle 8000. For example, as shown in FIGS. 16 to 18, the mounting portion 3110 of the hub assembly 3000 may comprise a sliding element 3190 configured to attach the hub assembly 3000 to the crossbar 2000 and to slide along the length of the crossbar. In some forms, the sliding element 3190 may fully surround or mostly surround the crossbar 2000 such that the crossbar is received within a hollow 3191 of the sliding element, as shown in FIGS. 3 and 16 to 18.

In the embodiment of FIGS. 16 to 18, the sliding element 3190 comprises at least one connecting member 3192 that is attachable to the hub assembly 3000, such as to the central body 3100. The connecting member 3192 and the lower portion 3160 of the central body 3100 of the hub assembly may together define a hollow 3191 for slidably receiving the crossbar 2000 therein. In some forms, a lower surface of the central body 3100 is located on an upper surface of the crossbar 2000 and the connecting member 3192 is at least partially located beneath a lower surface of the crossbar 2000.

In some forms, the sliding element 3190 comprises at least one pair of first and second arms 3193*a*, 3193*b* that project downwardly from opposing sides of the central body 3100 of the hub assembly and wrap around at least a portion of the sides of the crossbar 2000, forming a substantially "n" shaped arrangement and defining a hollow region between the arms 3193a, 3193b. The connecting member 3192 may be located beneath the central body 3100 and may be attachable to each of the first and second arms 3193a, 3193b. In some forms, the connecting member 3192 comprises a pair of upwardly projecting third and fourth arms 3194a, 3194b that wrap around at least a portion of the sides of the crossbar 2000, forming a substantially "u" shaped arrangement and defining a hollow region between the arms 3194a, 3194b. The hollow region between the arms of the connecting member 3192 and the hollow region between the arms of the central body 3100 may together form the hollow 3191 within which the crossbar 2000 is located in a slidable arrangement. The distance between the arms 3193a and 3193b of the central body 3100, and between the arms 3194a and 3194b of the connecting member 3192, is slightly larger than the width of the crossbar 2000 so that the crossbar fits snugly between the arms 3193a, 3193b, 3194a, 3194b without twisting.

In some forms, two pairs of first and second arms 3193a, 3193b, 3193c, 3193d (one pair in front of the other) and the sliding element 3190 also comprises a pair of first and second connectors 3192a, 3192b, each comprising third and fourth arms 3194a, 3194b, 3194c, 3194d for attaching to a respective first or second arm 3193a, 3193b, 3193c, 3193d of the sliding element 3190.

In some forms, as shown in FIGS. 16 to 18, the sliding element 3190 comprises a locking system to attach the hub assembly to the crossbar 2000 and to lock the hub assembly in position relative to the crossbar. For example, each arm 3193 of the central body 3100 may be configured to attach to a respective arm of the or each connecting member 3192a, 3192b by any suitable fastening system that allows the arms 3193 of the central body and the arms 3194 of the connecting member(s) to be urged toward each other in order to clamp the hub assembly 3000 to the crossbar 2000 and to thereby hold the hub assembly 3000 in a desired position along the length of the crossbar 2000. In some forms, each arm 3194 of the or each connecting member 3192a, 3192b comprises an opening, such as a threaded opening, that substantially aligns with an opening, such as a threaded opening, formed in the arms of the central body 3100. The aligned openings are configured to receive a fastener, such as a pin, screw, or bolt, that engages with the aligned openings to secure the or each connecting member 3192a, 3192b to the arms 3193 of the hub assembly 3000. By tightening the fasteners against the connecting member(s) 3192a, 3192b, the connecting member(s) is/are pulled toward the hub assembly 3000, clamping the connecting member(s) 3192a, 3192b against the crossbar 2000 to hold the crossbar in position within the hollow 3191. In this arrangement, the hub assembly 3000 and the attached saddle 4000 and leg assembly 5000 are prevented from sliding along the crossbar 2000.

In some forms, the seating system 1000 comprises a length-adjustable crossbar 2000, such as a telescoping crossbar 2000. In these forms, the crossbar 2000 may comprise at least two shafts: a first shaft 2100; and a second shaft 2200 that is slidable relative to the first shaft 2100 to adjust the length of the crossbar 2000. In some forms, the second shaft 2200 is slidable within the first shaft 2100. In these forms, the first shaft 2100 may comprise a distal end portion that is substantially hollow, or the hollow portion may extend along the entire length of the first shaft 2100. The transverse cross-section of the hollow portion of the first shaft 2100 may be larger than the transverse cross-section of the second shaft 2200 to allow the second shaft 2200 to fit within and slide within the hollow portion. Preferably, the second shaft 2200 fits snugly within the hollow portion of the first shaft 2100 and is slidable back and forth along the length of the hollow portion. In this arrangement, the length of the crossbar 2000 may be extended, by sliding at least a portion of the second shaft 2200 out of the hollow portion of the first shaft 2100. Conversely, the second shaft 2200 may be slid further into the hollow portion to reduce the length of the crossbar 2000. In some forms, the crossbar 2000 may comprise a locking system to lock the positions of the first and second shafts 2100, 2200 relative to each other when the crossbar 2000 is at the desired length and to unlock the shafts 2100, 2200 to further adjust the length of the crossbar 2000.

Figure 21:
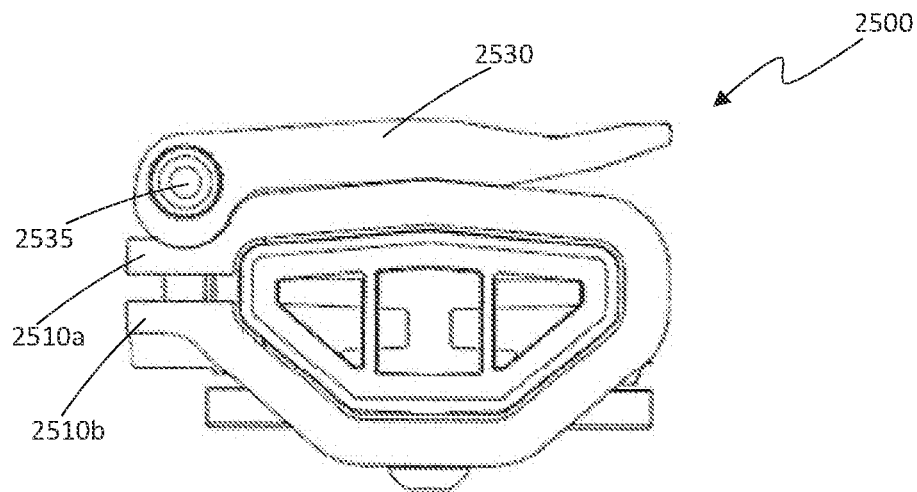
FIG. 21 is an end view of the crossbar with the clamping lever closed.
Figure 22:
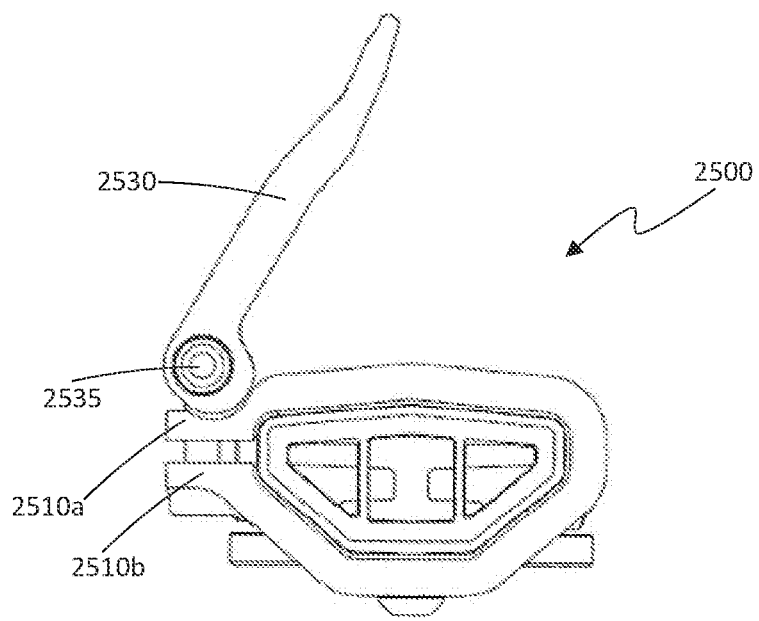
FIG. 22 is an end view of the crossbar with the clamping lever open.

In some forms, as shown in FIGS. 19 to 22, the crossbar locking system comprises a length adjustment clamp 2500. In these forms, the first shaft 2100 comprises a first end for attaching to the steering column of a bicycle and a second distal end for sliding engagement with the second shaft 2200. The clamp 2500 comprises a pair of arms 2510a, 2510b hingedly attached at a first end of each arm 2510a, 2510b. Each arm 2510a, 2510b also comprises a second, distal end. The distal ends of the arms 2510a, 2510b are urged toward each other to adopt a clamping/locked position and are moved away from each other to adopt an open, non-clamping/unlocked position. To lock the position of the second shaft 2200 relative to the first shaft 2100, such as when the second shaft 2200 is received within a portion of the first shaft 2100, the clamping arms 2510a, 2510b are hinged open and placed adjacent the distal end of the first shaft 2100. The clamping arms 2510a, 2510b are then hinged closed to substantially surround the distal end of the first shaft and so that the distal ends of the clamping arms 2510a, 2510b are substantially adjacent each other in an opposing arrangement. The clamp 2500 may also comprise a fastener that engages with the distal end of each clamping arm 2510a, 2510b and can be tightened to urge the arms 2510a, 2510b toward each other and lock the arms 2510a, 2510b together in a clamping/locked position. In this position, the clamp 2500 temporarily deforms the resilient distal end of the first shaft 2100 to clamp the first shaft 2100 against the second shaft 2200, holding the two shafts 2100, 2200 in position relative to each other in order to lock the length of the crossbar 2000. In some forms, forms, the fastener comprises a quick release cam lever 2530 comprising a cam at one end of the lever that is pivotally attached about a pivot 2535 at the distal end of one of the arms of the clamp, such as the first of the clamping arms 2510a and that engages with a screw fastener 2540 attached to the distal end of the second clamping arm 2510b when in the clamping/locked position. In the locked position, the protruding portion of the cam presses into a recess formed on one end of the first clamping arm 2510a, urging the arm 2510a toward the other clamping arm 2510b to clamp the first and second shafts 2100, 2200 of the crossbar 2000 to each other, as shown in FIG. 21. By rotating the cam lever 2530, the cam lever 2530 disengages from the screw fastener 2540, releasing the clamping pressure on the crossbar so that the length of the crossbar can be adjusted. By rotating the cam lever 2530 to the unlocked position, as shown in FIG. 22, the protruding portion of the cam rotates out of the recess to release the clamping force between the distal ends of the clamping arms 2510a, 2510b. The cam lever 2530 provides a quick release lever/mechanism by which a user can readily release/unlock and tighten/lock the engagement between the first and second shafts 2100, 2200 of the crossbar 2000.

In another form of crossbar locking system, a proximal end of the second shaft 2200 comprises a projecting lock stop that abuts a projecting limit stop located within the first shaft 2100 when the second shaft 2200 is at its maximum point of extension. The engagement between the lock stop and the limit stop prevents the second shaft 2200 from being fully retracted from the first shaft 2100. To compress the length of the crossbar 2000 to fit a smaller bicycle frame or for storage, the second shaft 2200 may be slid back within the first shaft 2100 until the desired length is obtained. The second shaft 2200 may comprise at least one compressible projecting member configured to engage with any one of a series of holes/apertures extending along at least a portion of the length of the first shaft 2100 to lock the shafts 2100, 2200 in position. To unlock the shafts 2100, 2200, the compressible member may be depressed to retract from the hole/aperture and the second shaft 2200 may be slid into or out of the first shaft 2100 until the crossbar reaches the desired length, at which point a user aligns the compressible member with an adjacent hole in the first shaft 2100 to engage with that hole and lock the length of the crossbar 2000.

The crossbar 2000 may comprise a first end 2001 comprising a first connector 2300 to attach the crossbar to the steering column of a bicycle 8000. The crossbar 2000 may also comprise a second end 2002 comprising a second connector to attach the crossbar to the seat post of the bicycle 8000.

In some forms, the first connector 2300 is hingedly attached to the crossbar 2000 to enable the crossbar 2000 to pivot up and down relative to the first connector 2300. This arrangement allows the angle of the crossbar 2000 to be adjusted to suit different bicycle frames. In some forms, the first connector 2300 comprises a body 2305, a hinge member 2310 extending from the body 2305 and being configured to attach to the first end 2001 of the crossbar 2000, a flexible ring 2320 configured to surround a portion of the steering column of the bicycle 8000; and a pair of arcuate clamping arms 2330a, 2330b that substantially surround the flexible ring 2320. The flexible ring 2320 defines a hollow region 2325 within which the steering column of the bicycle 8000 is received during use. The clamping arms 2330a, 2330b are configured to clamp the ring 2320 against the steering column. Each clamping arm 2330a, 2330b may comprise a first end 2331a, 2331b and a second end 2332a, 2332b. Either one or both clamping arms 2330a, 2330b may hinge about a pivot located at or near the first end 2331a, 2331b of the clamping arm(s) 2330. The second end 2332a, 2332b of each clamping arm 2330a, 2330b may be configured to attach to the second end 2332a, 2332b of the other clamping arm by a fastener 2340. The fastener 2340 may be tightened to urge the second ends 2332a, 2332b of the clamping arms 2330a, 2330b towards each other, thereby compressing the flexible ring 2320 and clamping the ring 2320 against the steering column.

Figure 23:
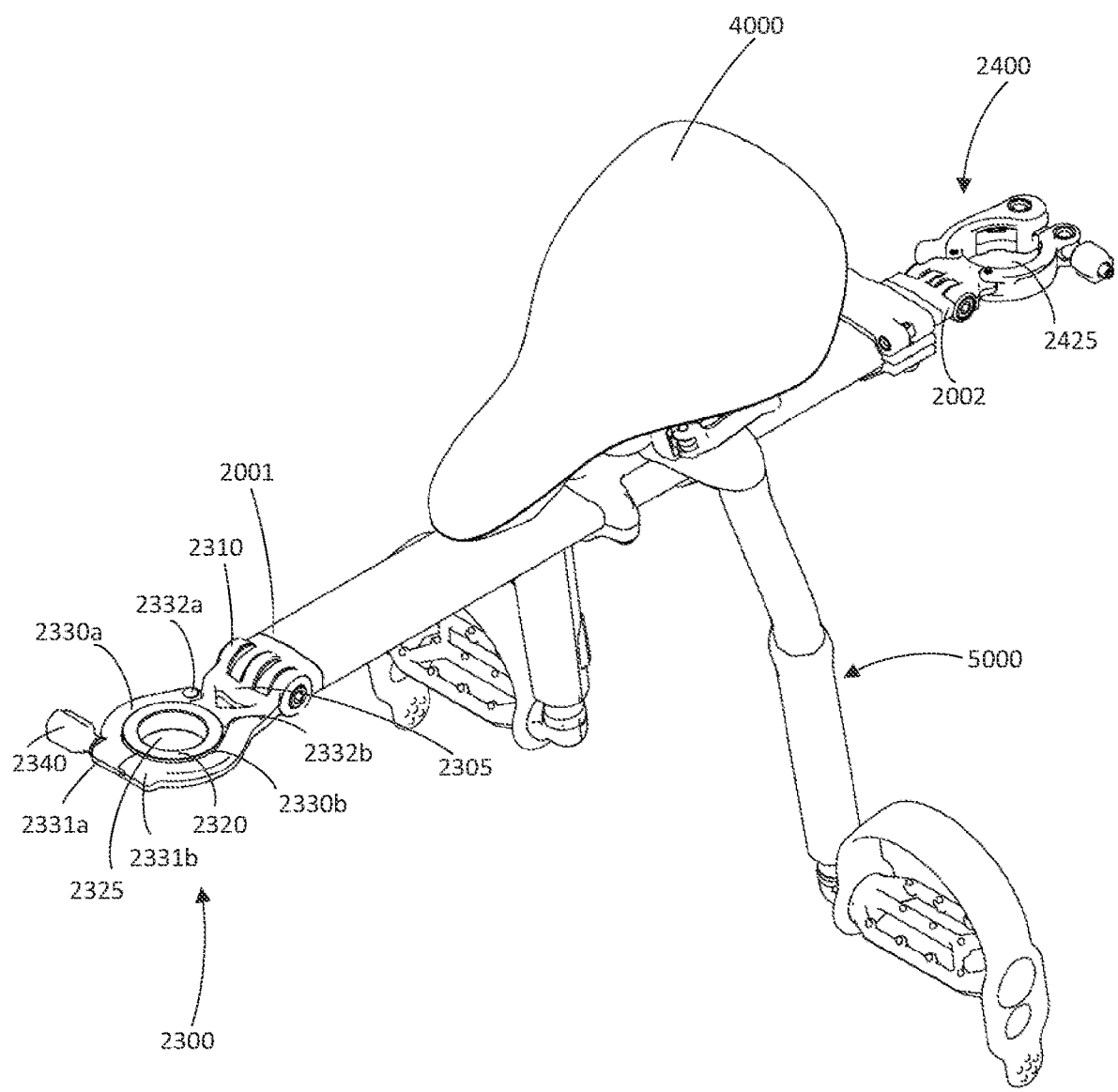
FIG. 23 is an isometric view of one form of the seating system and in which the first and second connectors of the crossbar are located at either end of the crossbar.

The second end 2002 of the crossbar 2000 comprises a second connector 2400 that is hingedly attached to the crossbar to further enable the crossbar 2000 to pivot up and down relative to the second connector 2400. This arrangement also allows the angle of the crossbar 2000 to be adjusted to suit different bicycle frames. In some forms, as shown in FIGS. 23 to 24E, the second connector 2400 comprises a body 2405, a hinge member 2410 extending from the body and being configured to hingedly attach to the second end 2002 of the crossbar, and a pair of first and second clamping arms 2430a, 2430b hingedly connected to opposing sides of the body 2405. The clamping arms 2430a, 2430b are configured to rotate toward each other to adopt a closed position and to rotate away from each other to adopt an open position. The body 2405 comprises an inner surface, which is preferably arcuate. The clamping arms 2430a, 2430b also comprise an arcuate inner surface, such that when the second connector 2400 is in the closed position, the inner surfaces of the connector body 2405 and the clamping arms 2430a, 2430b define a substantially circular hollow 2425 between the clamping arms 2430a, 2430b. The hollow 2425 may be shaped and dimensioned to receive the seat post of the bicycle 8000 therein.

Each clamping arm comprises a first end and a second end. Either one or both clamping arms 2430a, 2430b may hinge about a pivot 2420 located at or near the first end of the clamping arm 2430a, 2430b to adopt an open or closed position. In some forms, both clamping arms 2430a, 2430b hinge about a pivot 2420 to adopt an open or closed position. The second end of each clamping arm 2430a, 2430b may be configured to attach to the second end of the other clamping arm 2430a, 2430b by a locking system 2440. In some forms, the locking system comprises a fastener that engages with the second end of each clamping arm 2430a, 2430b and which may be tightened to urge the second ends of the clamping arms 2430a, 2430b towards each other to form a closed position in order to clamp the crossbar 2000 around the seat post. Similarly, the fastener may be loosened to release the clamping arms 2430a, 2430b from each other. In some forms, the fastener comprises a pin 2441 that is hingedly attached to one of the clamping arms 2430a, 2430b (such as the second clamping arm) about a pivot 2442 and is removably attached to the other of the clamping arms 2430a, 2430b (such as the first clamping arm). The pin 2441 attaches to both clamping arms 2430a, 2430b in the closed position. The pin 2441 may be configured to further urge the clamping arms together by shortening the length of the pin 2441 between the clamping arms 2430a, 2430b. This may be achieved by any suitable arrangement, such as by providing the distal end of the pin 2441 with a threaded portion and attaching a threaded nut or the like to the distal end portion. By tightening the nut against the clamping arm that receives the distal end of the pin (such as the first clamping arm), the arms 2430a, 2430b are urged toward each other to increase the clamping force induced by the second connector. To adopt the open position, the pin 2441 is rotated about the pivot 2442 to detach from the other clamping arm. The clamping arms 2430a, 2430b are then both rotated about pivots 2420 to form the open position.

In some forms, the second connector 2400 may be secured in the closed/locked position and released to the open/unlocked position by a quick release locking system 2440, as shown best in FIGS. 24A to 24E. The quick release locking system comprises a pin 2441 comprising a first end portion that is hingedly connected to the second clamping arm 2430b. In some forms, the pin 2441 is hingedly connected to a second end of the second clamping arm 2430b by a pin pivot 2442. In some forms, the first end portion of the pin 2441 is threaded and engages with a threaded fastener 2443, located proximate an outer surface of the second clamping arm 2430b, farthest from the first clamping arm 2430a. In some forms, the first clamping arm 2430a may comprise a curved recess/cam sliding base 2434 at or near the second end of the arm 2430a and located on an outer surface of the first clamping arm 2430a and farthest from the second clamping arm 2430b. The quick release locking system may also comprise a quick release cam lever 2444, located at a second end of the pin 2441. The cam lever 2444 comprises a body comprising a first end comprising a cam 2444*a* that rotates around a second pivot 2445 to open and close the lever 2444. The cam lever 2444 also comprises a second end, which may comprise a gripping portion 2444*b* for a user to grip in order to open and close the lever 2444. The curved cam 2444*a* of the lever 2444 is configured to nest within the curved recess/cam sliding base 2434 provided near the second end of the first clamping arm 2430*a*. The curved recess 2434 may comprise a pin receiving opening/slot 2435, extending from the tip of the second end of the first clamping arm 2430*a*, such that the second end of the first clamping arm 2430*a* forms a pronged structure, such as a two-pronged structure. A portion of the pin 2441 is received within the pin receiving opening 2435 when the cam 2444*a* nests within the recess 2434.

Figure 24A:
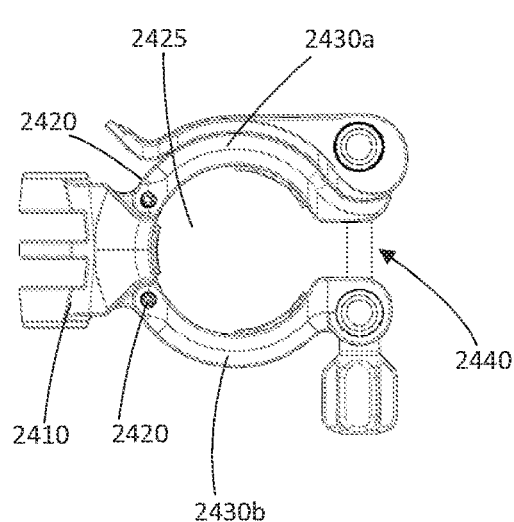
FIG. 24A is a top view showing one form of clamping connector for the crossbar in the closed position.
Figure 24B:
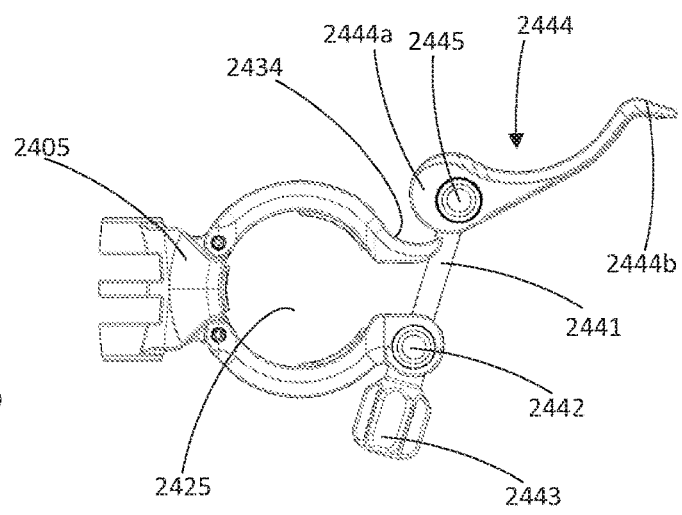
FIG. 24B shows the clamping connector of FIG. 24A in a partially opened position in which a locking pin of the clamping connector is being removed from one of the clamping arms of the connector.
Figure 24C:
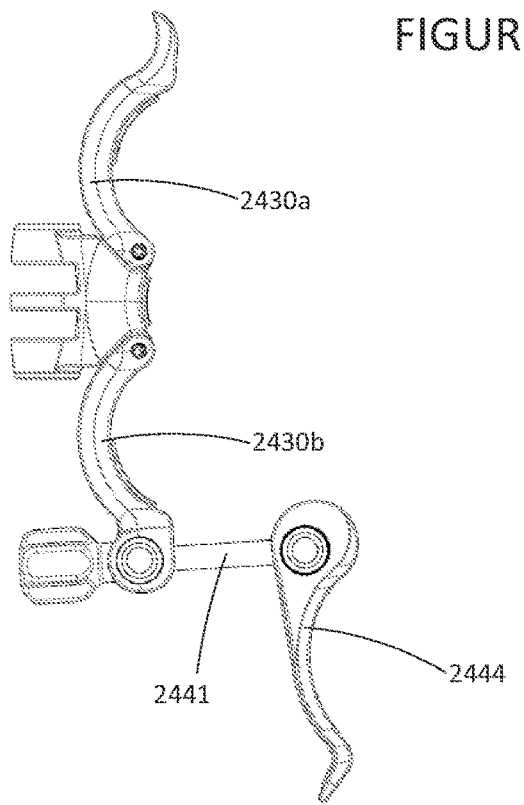
FIG. 24C shows the clamping connector of FIG. 24A in the open position.
Figure 24D:
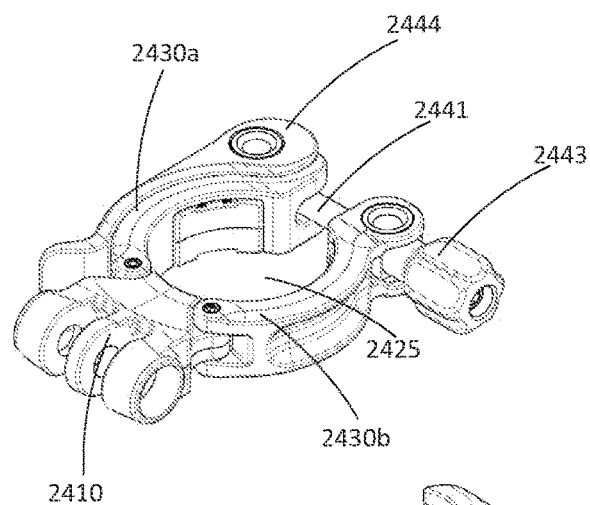
FIG. 24D is an isometric view of the clamping connector of FIG. 24A.
Figure 24E:
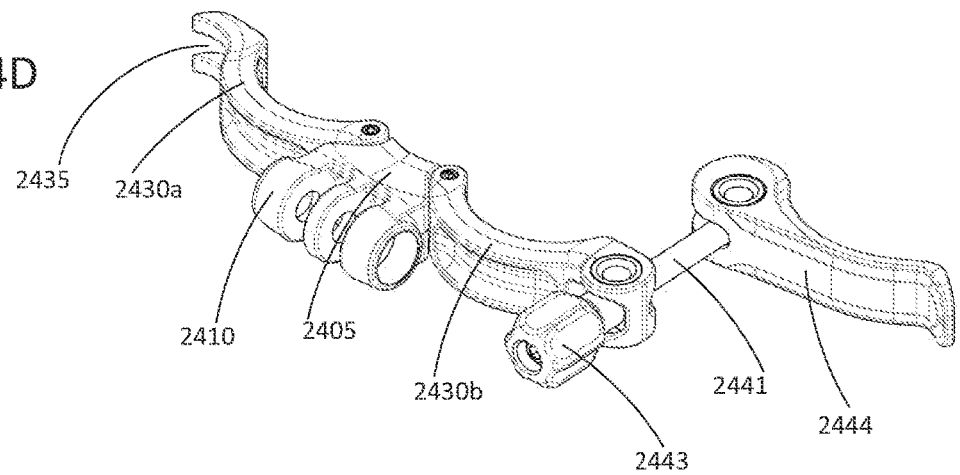
FIG. 24E is an isometric view of the clamping connector of FIG. 24C.

In this arrangement, in the closed position, as shown in FIGS. 24A and 24D, the distal end of the pin 2441 is slidably and removably received within the pin receiving opening 2435 of the first clamping arm 2430 and the cam 2444*a* of the quick release lever 2444 is nested in the recess/cam sliding base 2434 such that the larger radius of the cam 2444*a* presses against the surface of the recess 2434, urging the clamping arms 2430*a*, 2430*b* together. The body of the cam lever 2444 is closed against the outer surface of the first clamping arm 2430*a* and the fastener 2443 is tightened to further urge the clamping arms 2430*a*, 2430*b* toward each other.

The second connector 2400 may be opened, as shown in FIGS. 24B, 24C and 24E, by rotating the cam lever 2444 away from the first clamping arm 2430*a* to release the cam lock. As the lever 2444 is rotated away from the first clamping arm 2430*a*, the cam 2444*a* rotates within the recess 2434 so that the smaller radius of the cam is adjacent the surface of the recess 2434, releasing the compression force on the clamping arms 2430*a*, 2430*b*. The user may then pull the cam lever 2444 away from the first clamping arm 2340*a*, to detach the pin and cam lever 2444 from the first clamping arm. Once the quick release lever 2444 is detached from the first clamping arm 2430*a*, both clamping arms 2430*a*, 2430*b* may be rotated away from each other by hinging about pivots 2420, allowing the second connector 2400 to fully open, as shown in FIGS. 24C and 24E. The second connector is now ready to be removed from or attached to the seat post of a bicycle 8000.

One example of use of the seating system 1000 will now be described. To attach the crossbar 2000 of the seating system 1000 to a bicycle 8000, a ring 2320 is placed around the steering column of the bicycle and acts as a bearing for the first connector 2300. The arcuate inner surface of the body 2305 of the first connector and the arms 2330*a*, 2330*b* of the first connector are placed around the ring and the fastener 2340 secures the arms 2330*a*, 2330*b* together, clamping the arms 2330*a*, 2330*b* around the ring 2320.

To attach the crossbar 2000 to the seat post of the bicycle, the second connector 2400 is opened, as described above, and the inner surface of the connector body 2405 is placed against the seat post. The first clamping arm 2430*a* is then rotated toward the seat post until the arcuate inner surface of the first arm 2430*a* abuts the exterior surface of the seat post. The second clamping arm 2430*b* is also rotated toward the seat post until the arcuate inner surface of the second arm 2430*b* abuts the exterior surface of the seat post. The user may then rotate the pin 2441 about pivot 2442 until a portion of the pin 2441 is received within the pin receiving opening 2435 of the first clamping arm 2430*a* and the cam 2444*a* of the quick release lever 2444 nests within the recess 2434. The user then clamps the arms 2430*a*, 2430*b* together by rotating the lever 2444 until the larger radius of the cam presses against the recess 2434 and an inner surface of the lever 2444 contacts, or comes proximate to, an outer surface of the first clamping arm 2430*a*, thereby urging the clamping arms 2430*a*, 2430*b* toward each other to clamp around the seat post. The second connector 2400 is now attached to the seat post. The user may rotate the fastener 2443 to increase tension on the second connector by further urging the clamping arms 2430*a*, 2430*b* toward each other in order to tighten clamping arrangement of the second connector 2400. The user may release the second connector 2400 by rotating the lever 2444 open and pulling the lever 2444 away from the first clamping arm 2430*a* until the pin 2441 is removed from the pin receiving opening 2435.

The length of the crossbar 2000 is then adjusted to suit the bicycle frame, by sliding the second shaft 2200 of the crossbar relative to the first shaft 2100 until the desired length is achieved. The length adjustment clamp 2500 is then secured around the shafts 2100, 2200 (one within the other) to clamp the shafts 2100, 2200 together and lock the length of the crossbar 2000.

Once the crossbar 2000 is secured to the bicycle frame, the hub assembly 3000 (with saddle 4000 and leg assembly 5000 attached) is secured to the crossbar 2000 and the position of the hub assembly and saddle 4000 is adjusted relative to the length of the crossbar 2000. The hub assembly 3000 is attached to the crossbar 2000 by positioning the lower surface of the sliding element 3190 of the central body 3100 on the crossbar such that the arms 3193 of the central body extend around at least a portion of the sides of the crossbar 2000. Each connecting member 3192 is then loosely secured to the respective arms 3193 by fasteners. Once the connecting member(s) 3192 is/are attached to the hub assembly 3000, the hub assembly may be slid along the length of the crossbar 2000 until the saddle 4000 is in the desired position. The fasteners of the sliding element 3190 are then tightened to clamp the sliding element 3190 and therefore the seat assembly, (comprising the hub assembly 3000, saddle 4000 and leg assembly 5000) firmly to the crossbar 2000.

The angle of the saddle 4000 may also be adjusted relative to the crossbar 2000 by releasing the quick release levers 3470 and tilting the saddle to the desired position. By tilting the saddle, the saddle attachment members 3400 are caused to rotate, causing the locking pins 3440 to slide within the arcuate saddle adjustment slots 3121, 3218 of the hub assembly 3000. Once the saddle 4000 is at the desired angle, each lever 3470 may be rotated to the closed position by pressing the levers 3470 toward the hub assembly 3470. The angle of the saddle 4000 may be further secured by tightening fasteners 3445 to firmly clamp the saddle rails 4200 within the hub assembly 3000.

The width of the leg assembly 5000 may be adjusted by removing each leg 5100 from the respective leg connector 3220 and rotating the leg 5100 to engage with the appropriate alignment feature(s) 3221 in order to place the leg 5100 in a neutral position or a splayed position, as desired. Typically, if the splayed position is required, it is easiest if the hub assembly 3000 is attached to the crossbar 2000 without the leg assembly 5000 and the leg assembly is then be fitted to the hub assembly 3000 in the splayed position.

The length of the legs 5100 may also be adjusted by sliding the second element 5122 of each leg relative to the first element 5121 and then locking the second element 5122 in position.

Figure 25:
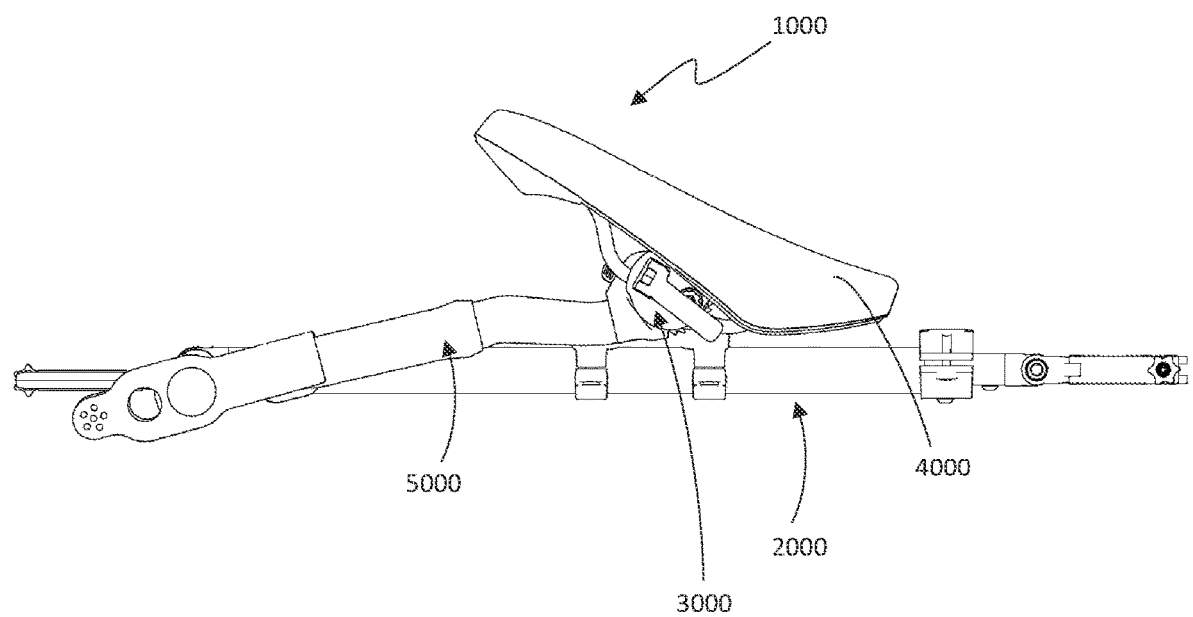
FIG. 25 is a side view of one form of the seating system in which the leg assembly is in the stowed position.

The angle of the leg assembly 5000, and therefore the angle of the legs 5100, may be adjusted to suit the bicycle frame and the comfort of the child. To adjust the angle of the leg assembly 5000, the leg locking lever 3170 is rotated (such as by lifting the free end of the lever) 3170 to disengage the catch(es) 3173 from the toothed rack 3213 of each leg attachment member 3200a, 3200b. The leg assembly 5000 can then be pushed forward or pulled backward to the desired angle. When the leg assembly 5000 is in the desired position, the leg locking lever 3170 may be released to cause the lever 3170 to automatically return to the locked position in which the catch(es) 3173 engage(s) with the toothed rack 3213 of each leg attachment member 3200a, 3200b to lock the leg assembly 5000 in the desired position. If the user wishes to stow the seating system 1000, the leg assembly 5000 can be rotated forward as far as possible. In this position, the footplates 5200 of the leg assembly are preferably aligned with the crossbar 2000, as shown in FIG. 25, to minimise the profile of the seating system 1000.

The seating system 1000 is therefore adjustable to suit different bicycle frames and to suit children of different heights.

The disclosure may also be said broadly to consist in the parts, elements and features referred to or indicated in the specification of the application, individually or collectively, in any or all combinations of two or more of said parts, elements or features.

Where, in the foregoing description reference has been made to integers or components having known equivalents thereof, those integers are herein incorporated as if individually set forth.

It should be noted that various changes and modifications to the disclosed embodiments described herein will be apparent to those skilled in the art. Such changes and modifications may be made without departing from the scope of the disclosure and without diminishing its attendant advantages. It is therefore intended that such changes and modifications be included within the scope of the disclosure.

The invention claimed is:

1. A connection hub to attach a bicycle saddle and leg assembly to a crossbar, the connection hub comprising:
   a central body attachable to the crossbar and comprising a pivotable leg locking lever;
   a pair of leg attachment members, each leg attachment member being rotatably attached to one side of the central body such that the central body is located between the leg attachment members;
   wherein each leg attachment member comprises a face plate rotatably attached to the central body, and also comprises a leg connector that attaches a pair of legs of the leg assembly to the connection hub, each of the legs comprising a foot support;
   wherein each face plate comprises a toothed rack and the leg locking lever comprises a pawl that engages with the toothed rack to lock the leg attachment member relative to the central body when the leg locking lever is in a locked position, thereby locking the angle of the legs relative to the connection hub, and wherein the pawl disengages from the toothed rack when the leg locking lever is in a unlocked position, allowing each leg attachment member to rotate relative to the connection hub to adjust the angle of the legs relative to the connection hub.

2. The connection hub of claim 1:
   wherein the central body comprises a pair of arcuate saddle adjustment slots extending from a first side of the central body to a second side of the central body;
   wherein the connection hub further comprises a pair of saddle attachment members, each saddle attachment member being rotatably attached to one of the leg attachment members and the central body, such that the leg attachment members are located between the central body and an adjacent one of the saddle attachment members;
   wherein each saddle attachment member comprises a saddle receiving portion to receive a portion of the saddle therein;
   wherein each face plate also comprises a pair of arcuate saddle adjustment slots that substantially align with the arcuate saddle adjustment slots of the central body; and
   wherein each saddle attachment member comprises a locking pin that extends through the aligned arcuate saddle adjustment slots and is slidable within the arcuate saddle adjustment slots to allow the angle of the saddle to be adjusted relative to the connection hub and the crossbar.

3. The connection hub of claim 1, wherein the central body comprises an attachment aperture and each leg attachment member comprises an attachment shaft that substantially aligns with the attachment aperture of the central body, and wherein each attachment shaft extends through at least a portion of the attachment aperture of the central body and engages with the other attachment shaft of the other leg attachment member to rotatably attach the leg attachment members to the central body and to each other.

4. The connection hub of claim 1, wherein each leg attachment member comprises an attachment aperture and wherein a fastener engages with the attachment apertures of the leg attachment members and the central body to rotatably attach the leg attachment members to the central body.

5. The connection hub of claim 1, wherein each leg connector is attachable to the respective leg in a first, neutral position, and in a second, splayed position, in which the legs are splayed apart.

6. The connection hub of claim 1, wherein the leg locking lever is biased to the locked position.

7. The connection hub of claim 1, wherein the legs are length-adjustable.

8. A seating system for a bicycle comprising a connection hub of claim 1 and also comprising a saddle attached to the connection hub, and a crossbar on which the connection hub is mounted.

9. The seating system of claim 8, wherein the connection hub is slidably mounted on the crossbar.

10. The seating system of claim 8, wherein the crossbar is extendable.

11. The seating system of claim 8, wherein the crossbar comprises a first connector, hingedly attached to a first end of the crossbar, and a second connector hingedly attached to a second end of the crossbar, wherein the first connector is configured to attach the seating system to a steering column of a bicycle and the second connector is configured to attach the seating system to a seat post of the bicycle.

12. The seating system of claim 8, wherein the second connector comprises a body comprising a hinge member for hingedly attaching to the crossbar, and a pair of clamping arms pivotally attached to the body and configured to rotate toward each other to form a closed position, in which the arms define a hollow region for receiving a portion of the seat post therein, and to rotate away from each other to form an open position, and wherein the second connector further comprises a pin hingedly attached to a first of the clamping arms and removably attachable to a second of the clamping arms to clamp the second connector around the seat post.

13. The seating system of claim 12, wherein a first end of the pin is hingedly attached to the first clamping arm and the second end of the pin is hingedly attached to a cam lever, wherein the second clamping arm comprises a distal end comprising an opening and also comprising a curved recess for receiving a cam of the cam lever, wherein in a locked position, a portion of the pin is removably received within the opening of the second clamping arm and the cam is received within the curved recess to urge the clamping arms toward each other.

14. A connection hub to attach a bicycle saddle and leg assembly to a crossbar, the connection hub comprising:
- a central body attachable to the crossbar;
- a pair of leg attachment members, each leg attachment member being rotatably attached to one side of the central body such that the central body is located between the leg attachment members; and
- a pair of saddle attachment members, each saddle attachment member being rotatably attached to one of the leg attachment members and the central body, such that the leg attachment members are located between the central body and an adjacent one of the saddle attachment members;
- wherein each leg attachment member comprises a face plate rotatably attached to the central body, and also comprises a leg connector that attaches a pair of legs of the leg assembly to the connection hub, each of the legs comprising a foot support;
- wherein each saddle attachment member comprises a saddle receiving portion to receive a portion of the saddle therein;
- wherein the central body comprises a pair of arcuate saddle adjustment slots extending from a first side of the central body to a second side of the central body;
- wherein each leg attachment member comprises a pair of arcuate saddle adjustment slots that substantially align with the arcuate saddle adjustment slots of the central body; and
- wherein each saddle attachment member comprises a locking pin that extends through the aligned arcuate saddle adjustment slots and is slidable within the arcuate saddle adjustment slots to allow the angle of the saddle to be adjusted relative to the connection hub and the crossbar.

15. The connection hub of claim 14, wherein the saddle comprises a cushion and a pair of tubular saddle rails located beneath the cushion, and wherein the saddle receiving portion of each saddle attachment member is located on an inner surface of the saddle attachment member and comprises a channel for receiving a portion of a respective saddle rail.

* * * * *